(12) United States Patent
Lisboa

(10) Patent No.: US 12,523,717 B2
(45) Date of Patent: Jan. 13, 2026

(54) CLOSED LOOP MAGNETIC FIELD SENSOR WITH CURRENT CONTROL

(71) Applicant: Allegro MicroSystems, LLC, Manchester, NH (US)

(72) Inventor: Pablo Castro Lisboa, Montevideo (UY)

(73) Assignee: Allegro MicroSystems, LLC, Manchester, NH (US)

( * ) Notice: Subject to any disclaimer, the term of this patent is extended or adjusted under 35 U.S.C. 154(b) by 216 days.

(21) Appl. No.: 18/442,537

(22) Filed: Feb. 15, 2024

(65) Prior Publication Data

US 2025/0264554 A1  Aug. 21, 2025

(51) Int. Cl.
*G01R 33/00* (2006.01)
*G01R 15/20* (2006.01)
*G01R 33/07* (2006.01)
*G01R 33/09* (2006.01)

(52) U.S. Cl.
CPC ......... *G01R 33/0041* (2013.01); *G01R 15/20* (2013.01); *G01R 33/07* (2013.01); *G01R 33/09* (2013.01)

(58) Field of Classification Search
CPC .... G01R 33/0041; G01R 15/20; G01R 33/07; G01R 33/09
See application file for complete search history.

(56) References Cited

U.S. PATENT DOCUMENTS

| 3,132,337 A | 5/1964 | Martin |
| 3,195,043 A | 7/1965 | Burig et al. |
| 3,281,628 A | 10/1966 | Bauer et al. |
| 3,607,528 A | 9/1971 | Gassaway |
| 3,611,138 A | 10/1971 | Winebrener |
| 3,661,061 A | 5/1972 | Tokarz |
| 3,728,786 A | 4/1973 | Lucas et al. |

(Continued)

FOREIGN PATENT DOCUMENTS

| CH | 683 469 A5 | 3/1994 |
| CN | 101009474 A | 1/2007 |

(Continued)

OTHER PUBLICATIONS

U.S. Appl. No. 14/748,823, filed Jun. 24, 2015, Sirohiwala et al.

(Continued)

*Primary Examiner* — Alvaro E Fortich
(74) *Attorney, Agent, or Firm* — DALY, CROWLEY, MOFFORD & DURKEE, LLP

(57) ABSTRACT

Method and apparatus for a closed loop CAPS magnetic field sensor having an emitter coil current that corresponds to a distance from a target. An emitter coil drive circuit outputs an emitter current to an emitter coil for generating an emitter field and a reference coil drive circuit outputs a reference current to a reference coil for generating a reference field. The combined fields generate an applied field and a magnetic field sensing element generates an electric signal. The sensor has a closed loop configuration with a feedback path that includes the emitter coil drive circuit and the emitter coil and is configured to modify an amplitude of the emitter current signal based on a distance from the target to the magnetic field sensing element.

15 Claims, 7 Drawing Sheets

(56) References Cited

U.S. PATENT DOCUMENTS

| | | |
|---|---|---|
| 4,048,670 A | 9/1977 | Eysermans |
| 4,180,753 A | 12/1979 | Cook, II |
| 4,188,605 A | 2/1980 | Stout |
| 4,204,317 A | 5/1980 | Winn |
| 4,236,832 A | 12/1980 | Komatsu et al. |
| 4,283,643 A | 8/1981 | Levin |
| 4,315,523 A | 2/1982 | Mahawili et al. |
| 4,438,347 A | 3/1984 | Gehring |
| 4,573,258 A | 3/1986 | Io et al. |
| 4,614,111 A | 9/1986 | Wolff |
| 4,649,796 A | 3/1987 | Schmidt |
| 4,670,715 A | 6/1987 | Fuzzell |
| 4,703,378 A | 10/1987 | Imakoshi et al. |
| 4,719,419 A | 1/1988 | Dawley |
| 4,733,455 A | 3/1988 | Nakamura et al. |
| 4,745,363 A | 5/1988 | Carr et al. |
| 4,746,859 A | 5/1988 | Malik |
| 4,752,733 A | 6/1988 | Petr et al. |
| 4,758,943 A | 7/1988 | Aström et al. |
| 4,760,285 A | 7/1988 | Nelson |
| 4,764,767 A | 8/1988 | Ichikawa et al. |
| 4,769,344 A | 9/1988 | Sakai et al. |
| 4,772,929 A | 9/1988 | Manchester |
| 4,789,826 A | 12/1988 | Willett |
| 4,796,354 A | 1/1989 | Yokoyama et al. |
| 4,823,075 A | 4/1989 | Alley |
| 4,833,406 A | 5/1989 | Foster |
| 4,893,027 A | 1/1990 | Kammerer et al. |
| 4,908,685 A | 3/1990 | Shibasaki et al. |
| 4,910,861 A | 3/1990 | Dohogne |
| 4,935,698 A | 6/1990 | Kawaji et al. |
| 4,944,028 A | 7/1990 | Iijima et al. |
| 4,954,777 A | 9/1990 | Klopfer et al. |
| 4,970,411 A | 11/1990 | Halg et al. |
| 4,983,916 A | 1/1991 | Iijima et al. |
| 4,991,447 A | 2/1991 | Yahagi et al. |
| 5,012,322 A | 4/1991 | Guillotte et al. |
| 5,021,493 A | 6/1991 | Sandstrom |
| 5,028,868 A | 7/1991 | Murata et al. |
| 5,045,920 A | 9/1991 | Vig et al. |
| 5,078,944 A | 1/1992 | Yoshino |
| 5,084,289 A | 1/1992 | Shin et al. |
| 5,121,289 A | 6/1992 | Gagliardi |
| 5,137,677 A | 8/1992 | Murata |
| 5,139,973 A | 8/1992 | Nagy et al. |
| 5,167,896 A | 12/1992 | Hirota et al. |
| 5,185,919 A | 2/1993 | Hickey |
| 5,196,794 A | 3/1993 | Murata |
| 5,200,698 A | 4/1993 | Thibaud |
| 5,210,493 A | 5/1993 | Schroeder et al. |
| 5,216,405 A | 6/1993 | Schroeder et al. |
| 5,244,834 A | 9/1993 | Suzuki et al. |
| 5,247,202 A | 9/1993 | Popovic et al. |
| 5,247,278 A | 9/1993 | Pant et al. |
| 5,250,925 A | 10/1993 | Shinkle |
| 5,286,426 A | 2/1994 | Rano, Jr. et al. |
| 5,289,344 A | 2/1994 | Gagnon et al. |
| 5,315,245 A | 5/1994 | Schroeder et al. |
| 5,329,416 A | 7/1994 | Ushiyama et al. |
| 5,332,956 A | 7/1994 | Oh |
| 5,332,965 A | 7/1994 | Wolf et al. |
| 5,351,028 A | 9/1994 | Krahn |
| 5,399,968 A | 3/1995 | Sheppard et al. |
| 5,412,255 A | 5/1995 | Wallrafen |
| 5,414,355 A | 5/1995 | Davidson et al. |
| 5,424,558 A | 6/1995 | Borden et al. |
| 5,432,444 A | 7/1995 | Yasohama et al. |
| 5,434,105 A | 7/1995 | Liou |
| 5,453,727 A | 9/1995 | Shibasaki et al. |
| 5,469,058 A | 11/1995 | Dunnam |
| 5,479,695 A | 1/1996 | Grader et al. |
| 5,486,759 A | 1/1996 | Seiler et al. |
| 5,488,294 A | 1/1996 | Liddell et al. |
| 5,491,633 A | 2/1996 | Henry et al. |
| 5,497,081 A | 3/1996 | Wolf et al. |
| 5,500,589 A | 3/1996 | Sumcad |
| 5,500,994 A | 3/1996 | Itaya |
| 5,508,611 A | 4/1996 | Schroeder et al. |
| 5,514,953 A | 5/1996 | Schultz et al. |
| 5,521,501 A | 5/1996 | Dettmann et al. |
| 5,545,983 A | 8/1996 | Okeya et al. |
| 5,551,146 A | 9/1996 | Kawabata et al. |
| 5,581,170 A | 12/1996 | Mammano et al. |
| 5,581,179 A | 12/1996 | Engel et al. |
| 5,596,272 A | 1/1997 | Busch |
| 5,621,319 A | 4/1997 | Bilotti et al. |
| 5,627,315 A | 5/1997 | Figi et al. |
| 5,631,557 A | 5/1997 | Davidson |
| 5,640,090 A | 6/1997 | Furuya et al. |
| 5,691,637 A | 11/1997 | Oswald et al. |
| 5,696,790 A | 12/1997 | Graham et al. |
| 5,712,562 A | 1/1998 | Berg |
| 5,714,102 A | 2/1998 | Highum et al. |
| 5,719,496 A | 2/1998 | Wolf |
| 5,729,128 A | 3/1998 | Bunyer et al. |
| 5,757,181 A | 5/1998 | Wolf et al. |
| 5,781,005 A | 7/1998 | Vig et al. |
| 5,789,658 A | 8/1998 | Henn et al. |
| 5,789,915 A | 8/1998 | Ingraham |
| 5,796,249 A | 8/1998 | Andräet et al. |
| 5,798,462 A | 8/1998 | Briefer et al. |
| 5,818,222 A | 10/1998 | Ramsden |
| 5,818,223 A | 10/1998 | Wolf |
| 5,831,431 A | 11/1998 | Gottfried-Gottfried et al. |
| 5,839,185 A | 11/1998 | Smith et al. |
| 5,841,276 A | 11/1998 | Makino et al. |
| 5,859,387 A | 1/1999 | Gagnon |
| 5,877,911 A * | 3/1999 | Klaassen ............... G11B 5/012 |
| 5,883,567 A | 3/1999 | Mullins, Jr. |
| 5,886,070 A | 3/1999 | Honkura et al. |
| 5,896,030 A | 4/1999 | Hasken |
| 5,912,556 A | 6/1999 | Frazee et al. |
| 5,963,028 A | 10/1999 | Engel et al. |
| 6,011,770 A | 1/2000 | Tan |
| 6,016,055 A | 1/2000 | Jager et al. |
| 6,032,536 A | 3/2000 | Peeters et al. |
| 6,043,644 A | 3/2000 | de Coulon et al. |
| 6,043,646 A | 3/2000 | Jansseune |
| 6,064,198 A | 5/2000 | Wolf et al. |
| 6,131,457 A | 10/2000 | Sato |
| 6,136,250 A | 10/2000 | Brown |
| 6,169,396 B1 | 1/2001 | Yokotani et al. |
| 6,175,232 B1 | 1/2001 | De Coulon et al. |
| 6,175,233 B1 | 1/2001 | McCurley et al. |
| 6,180,041 B1 | 1/2001 | Takizawa |
| 6,184,679 B1 | 2/2001 | Popovic et al. |
| 6,198,373 B1 | 3/2001 | Ogawa et al. |
| 6,204,662 B1 | 3/2001 | Shinjo et al. |
| 6,242,604 B1 | 6/2001 | Hudlicky et al. |
| 6,242,904 B1 | 6/2001 | Shirai et al. |
| 6,242,905 B1 | 6/2001 | Draxelmayr |
| 6,265,865 B1 | 7/2001 | Engel et al. |
| 6,278,269 B1 | 8/2001 | Vig et al. |
| 6,288,533 B1 | 9/2001 | Haeberli et al. |
| 6,297,627 B1 | 10/2001 | Towne et al. |
| 6,339,322 B1 | 1/2002 | Loreck et al. |
| 6,351,506 B1 | 2/2002 | Lewicki |
| 6,356,068 B1 | 3/2002 | Steiner et al. |
| 6,366,079 B1 | 4/2002 | Uenoyama |
| 6,392,478 B1 | 5/2002 | Mulder et al. |
| 6,429,640 B1 | 8/2002 | Daughton et al. |
| 6,436,748 B1 | 8/2002 | Forbes et al. |
| 6,437,558 B2 | 8/2002 | Li et al. |
| 6,452,381 B1 | 9/2002 | Nakatani et al. |
| 6,462,536 B1 | 10/2002 | Mednikov et al. |
| 6,492,804 B2 | 12/2002 | Tsuge et al. |
| 6,501,270 B1 | 12/2002 | Opie |
| 6,504,363 B1 | 1/2003 | Dogaru et al. |
| 6,525,531 B2 | 2/2003 | Forrest et al. |
| 6,528,992 B2 | 3/2003 | Shinjo et al. |
| 6,542,847 B1 | 4/2003 | Lohberg et al. |
| 6,545,332 B2 | 4/2003 | Huang |
| 6,545,457 B2 | 4/2003 | Goto et al. |
| 6,545,462 B2 | 4/2003 | Schott et al. |

(56) References Cited

U.S. PATENT DOCUMENTS

| | | |
|---|---|---|
| 6,566,862 B1 | 5/2003 | Goto et al. |
| 6,566,872 B1 | 5/2003 | Sugitani |
| 6,580,269 B2 | 6/2003 | Hiligsmann et al. |
| 6,640,451 B1 | 11/2003 | Vinarcik |
| 6,653,968 B1 | 11/2003 | Schneider |
| 6,674,679 B1 | 1/2004 | Perner et al. |
| 6,687,644 B1 | 2/2004 | Zinke et al. |
| 6,692,676 B1 | 2/2004 | Vig et al. |
| 6,707,298 B2 | 3/2004 | Suzuki et al. |
| 6,759,843 B2 | 7/2004 | Furlong |
| 6,770,163 B1 | 8/2004 | Kuah et al. |
| 6,781,233 B2 | 8/2004 | Zverev et al. |
| 6,781,359 B2 | 8/2004 | Stauth et al. |
| 6,798,193 B2 | 9/2004 | Zimmerman et al. |
| 6,815,944 B2 | 11/2004 | Vig et al. |
| 6,822,443 B1 | 11/2004 | Dogaru |
| 6,853,178 B2 | 2/2005 | Hayat-Dawoodi |
| 6,896,407 B2 | 5/2005 | Nomiyama et al. |
| 6,902,951 B2 | 6/2005 | Goller et al. |
| 6,917,321 B1 | 7/2005 | Haurie et al. |
| 6,956,366 B2 | 10/2005 | Butzmann |
| 6,989,921 B2 | 1/2006 | Bernstein et al. |
| 7,023,205 B1 | 4/2006 | Krupp |
| 7,026,808 B2 | 4/2006 | Vig et al. |
| 7,031,170 B2 | 4/2006 | Daeche et al. |
| 7,038,448 B2 | 5/2006 | Schott et al. |
| 7,049,924 B2 | 5/2006 | Hayashi et al. |
| 7,112,955 B2 | 9/2006 | Buchhold |
| 7,112,957 B2 | 9/2006 | Bicking |
| 7,126,327 B1 | 10/2006 | Busch |
| 7,132,825 B2 | 11/2006 | Martin |
| 7,190,784 B2 | 3/2007 | Li |
| 7,193,412 B2 | 3/2007 | Freeman |
| 7,199,579 B2 | 4/2007 | Scheller et al. |
| 7,259,545 B2 | 8/2007 | Stauth et al. |
| 7,265,531 B2 | 9/2007 | Stauth et al. |
| 7,269,992 B2 | 9/2007 | Lamb et al. |
| 7,285,952 B1 | 10/2007 | Hatanaka et al. |
| 7,292,095 B2 | 11/2007 | Burt et al. |
| 7,295,000 B2 | 11/2007 | Werth |
| 7,319,319 B2 | 1/2008 | Jones et al. |
| 7,323,780 B2 | 1/2008 | Daubenspeck et al. |
| 7,323,870 B2 | 1/2008 | Tatschl et al. |
| 7,325,175 B2 | 1/2008 | Momtaz |
| 7,345,468 B2 | 3/2008 | Okada et al. |
| 7,355,388 B2 | 4/2008 | Ishio |
| 7,361,531 B2 | 4/2008 | Sharma et al. |
| 7,362,094 B2 | 4/2008 | Voisine et al. |
| 7,365,530 B2 | 4/2008 | Bailey et al. |
| 7,385,394 B2 | 6/2008 | Auburger et al. |
| 7,425,821 B2 | 9/2008 | Monreal et al. |
| 7,474,093 B2 | 1/2009 | Ausserlechner |
| 7,476,953 B2 | 1/2009 | Taylor et al. |
| 7,518,354 B2 | 4/2009 | Stauth et al. |
| 7,592,801 B2 | 9/2009 | Bailey et al. |
| 7,598,601 B2 | 10/2009 | Taylor et al. |
| 7,605,647 B1 | 10/2009 | Romero et al. |
| 7,635,993 B2 | 12/2009 | Boeve |
| 7,694,200 B2 | 4/2010 | Forrest et al. |
| 7,701,208 B2 | 4/2010 | Nishikawa |
| 7,705,586 B2 | 4/2010 | Van Zon et al. |
| 7,729,675 B2 | 6/2010 | Krone |
| 7,746,056 B2 | 6/2010 | Stauth et al. |
| 7,746,065 B2 | 6/2010 | Pastre et al. |
| 7,764,118 B2 | 7/2010 | Kusuda et al. |
| 7,768,083 B2 | 8/2010 | Doogue et al. |
| 7,769,110 B2 | 8/2010 | Momtaz |
| 7,800,389 B2 | 9/2010 | Friedrich et al. |
| 7,808,074 B2 | 10/2010 | Knittl |
| 7,816,772 B2 | 10/2010 | Engel et al. |
| 7,816,905 B2 | 10/2010 | Doogue et al. |
| 7,839,141 B2 | 11/2010 | Werth et al. |
| 7,923,996 B2 | 4/2011 | Doogue et al. |
| 7,932,718 B1 | 4/2011 | Weigert |
| 7,936,144 B2 | 5/2011 | Vig et al. |
| 7,956,604 B2 | 6/2011 | Ausserlechner |
| 7,961,823 B2 | 6/2011 | Kolze et al. |
| 7,982,454 B2 | 7/2011 | Fernandez et al. |
| 7,990,209 B2 | 8/2011 | Romero |
| 8,030,918 B2 | 10/2011 | Doogue et al. |
| 8,058,870 B2 | 11/2011 | Sterling |
| 8,063,631 B2 | 11/2011 | Fermon et al. |
| 8,063,634 B2 | 11/2011 | Sauber et al. |
| 8,080,993 B2 | 12/2011 | Theuss et al. |
| 8,106,649 B2 | 1/2012 | Kaita et al. |
| 8,106,654 B2 | 1/2012 | Theuss et al. |
| 8,128,549 B2 | 3/2012 | Testani et al. |
| 8,134,358 B2 | 3/2012 | Charlier et al. |
| 8,143,169 B2 | 3/2012 | Engel et al. |
| 8,253,210 B2 | 8/2012 | Theuss et al. |
| 8,274,279 B2 | 9/2012 | Gies |
| 8,299,783 B2 | 10/2012 | Fernandez et al. |
| 8,362,579 B2 | 1/2013 | Theuss et al. |
| 8,447,556 B2 | 5/2013 | Friedrich et al. |
| 8,461,677 B2 | 6/2013 | Ararao et al. |
| 8,486,755 B2 | 7/2013 | Ararao et al. |
| 8,542,010 B2 | 9/2013 | Cesaretti et al. |
| 8,559,139 B2 | 10/2013 | Theuss |
| 8,575,929 B1 | 11/2013 | Wiegert |
| 8,577,634 B2 | 11/2013 | Donovan et al. |
| 8,610,430 B2 | 12/2013 | Werth et al. |
| 8,624,588 B2 | 1/2014 | Vig et al. |
| 8,629,520 B2 | 1/2014 | Doogue et al. |
| 8,629,539 B2 | 1/2014 | Milano et al. |
| 8,680,846 B2 | 3/2014 | Cesaretti et al. |
| 8,680,848 B2 | 3/2014 | Foletto et al. |
| 8,754,640 B2 | 6/2014 | Vig et al. |
| 8,773,124 B2 | 7/2014 | Ausserlechner |
| 9,081,041 B2 | 7/2015 | Friedrich et al. |
| 9,116,018 B2 | 8/2015 | Frachon |
| 9,164,156 B2 | 10/2015 | Elian et al. |
| 9,201,122 B2 | 12/2015 | Cesaretti et al. |
| 9,201,123 B2 | 12/2015 | Elian et al. |
| 9,228,860 B2 | 1/2016 | Sharma et al. |
| 9,411,025 B2 | 8/2016 | David et al. |
| 9,625,535 B2 | 4/2017 | Cadugan et al. |
| 9,664,494 B2 | 5/2017 | Fernandez et al. |
| 9,797,746 B2 | 10/2017 | Vuillermet et al. |
| 9,852,832 B2 | 12/2017 | Sirohiwala et al. |
| 10,444,299 B2 | 10/2019 | Romero et al. |
| 10,481,219 B2 | 11/2019 | Romero et al. |
| 10,823,789 B2 | 11/2020 | Rossi et al. |
| 10,837,943 B2 | 11/2020 | Romero |
| 10,917,092 B2 | 2/2021 | Romero |
| 10,921,391 B2 | 2/2021 | Lassalle-Balier et al. |
| 10,996,289 B2 | 5/2021 | Latham et al. |
| 11,112,230 B2 | 9/2021 | Latham et al. |
| 11,143,732 B2 | 10/2021 | Romero et al. |
| 11,150,110 B2 | 10/2021 | Cadugan |
| 11,255,700 B2 | 2/2022 | Lassalle-Balier et al. |
| 11,262,422 B2 | 3/2022 | Romero |
| 11,313,924 B2 | 4/2022 | David et al. |
| 11,320,496 B2 | 5/2022 | Latham et al. |
| 11,467,235 B1 | 10/2022 | Romero et al. |
| 11,493,361 B2 | 11/2022 | Romero |
| 11,555,872 B2 | 1/2023 | Romero |
| 11,578,997 B1 | 2/2023 | Romero et al. |
| 11,624,791 B2 | 4/2023 | Romero |
| 11,680,996 B2 | 6/2023 | Pepka et al. |
| 11,686,599 B2 | 6/2023 | Lassalle-Balier et al. |
| 2001/0002791 A1 | 6/2001 | Tsuge et al. |
| 2001/0009367 A1 | 7/2001 | Seitzer et al. |
| 2001/0026153 A1 | 10/2001 | Nakamura et al. |
| 2002/0008513 A1 | 1/2002 | Hiligsmann et al. |
| 2002/0027488 A1 | 3/2002 | Hayat-Dawoodi et al. |
| 2002/0084923 A1 | 7/2002 | Li |
| 2002/0097639 A1 | 7/2002 | Ishizaki et al. |
| 2003/0001563 A1 | 1/2003 | Turner |
| 2003/0038675 A1 | 2/2003 | Gailus et al. |
| 2003/0057983 A1 | 3/2003 | Kim et al. |
| 2003/0062891 A1 | 4/2003 | Slates |
| 2003/0102909 A1 | 6/2003 | Motz |
| 2003/0222642 A1 | 12/2003 | Butzmann |
| 2003/0227286 A1 | 12/2003 | Dunisch et al. |

(56) References Cited

U.S. PATENT DOCUMENTS

| | | |
|---|---|---|
| 2004/0032251 A1 | 2/2004 | Zimmerman et al. |
| 2004/0046248 A1 | 3/2004 | Waelti et al. |
| 2004/0062362 A1 | 4/2004 | Matsuya |
| 2004/0080314 A1 | 4/2004 | Tsujii et al. |
| 2004/0135220 A1 | 7/2004 | Goto |
| 2004/0174164 A1 | 9/2004 | Ao |
| 2004/0184196 A1 | 9/2004 | Jayasekara |
| 2004/0189285 A1 | 9/2004 | Uenoyama |
| 2004/0196045 A1 | 10/2004 | Larsen |
| 2004/0263014 A1 | 12/2004 | Miya |
| 2005/0017709 A1 | 1/2005 | Stolfus et al. |
| 2005/0120782 A1 | 6/2005 | Kishibata et al. |
| 2005/0122095 A1 | 6/2005 | Dooley |
| 2005/0122099 A1 | 6/2005 | Imamoto et al. |
| 2005/0140355 A1 | 6/2005 | Yamada et al. |
| 2005/0167790 A1 | 8/2005 | Khor et al. |
| 2005/0179429 A1 | 8/2005 | Lohberg |
| 2005/0225318 A1 | 10/2005 | Bailey et al. |
| 2005/0280411 A1 | 12/2005 | Bicking |
| 2006/0033487 A1 | 2/2006 | Nagano et al. |
| 2006/0038559 A1 | 2/2006 | Lamb et al. |
| 2006/0038561 A1 | 2/2006 | Honkura et al. |
| 2006/0068237 A1 | 3/2006 | Murphy et al. |
| 2006/0097717 A1 | 5/2006 | Tokuhara et al. |
| 2006/0125473 A1 | 6/2006 | Frachon et al. |
| 2006/0181263 A1 | 8/2006 | Doogue et al. |
| 2006/0202692 A1 | 9/2006 | Tatschl et al. |
| 2006/0261801 A1 | 11/2006 | Busch |
| 2007/0110199 A1 | 5/2007 | Momtaz et al. |
| 2007/0170533 A1 | 7/2007 | Doogue et al. |
| 2007/0247135 A1 | 10/2007 | Koga |
| 2007/0247141 A1 | 10/2007 | Pastre et al. |
| 2007/0285089 A1 | 12/2007 | Ibuki et al. |
| 2008/0013298 A1 | 1/2008 | Sharma et al. |
| 2008/0137784 A1 | 6/2008 | Krone |
| 2008/0211492 A1 | 9/2008 | Tsukada et al. |
| 2008/0237818 A1 | 10/2008 | Engel et al. |
| 2008/0238410 A1 | 10/2008 | Charlier et al. |
| 2008/0258722 A1 | 10/2008 | Zon et al. |
| 2008/0270067 A1 | 10/2008 | Eriksen et al. |
| 2009/0001964 A1 | 1/2009 | Strzalkowski |
| 2009/0009163 A1 | 1/2009 | Yamada |
| 2009/0058404 A1 | 3/2009 | Kurumado |
| 2009/0085706 A1 | 4/2009 | Baarman et al. |
| 2009/0102467 A1 | 4/2009 | Snell et al. |
| 2009/0137398 A1 | 5/2009 | Bozovic et al. |
| 2009/0140724 A1 | 6/2009 | Kentsch |
| 2009/0140725 A1 | 6/2009 | Ausserlechner |
| 2009/0146647 A1 | 6/2009 | Ausserlechner |
| 2009/0152696 A1 | 6/2009 | Dimasacat et al. |
| 2009/0167298 A1 | 7/2009 | Kreutzbruck et al. |
| 2009/0167301 A1 | 7/2009 | Ausserlechner |
| 2009/0168286 A1 | 7/2009 | Berkley et al. |
| 2009/0206831 A1 | 8/2009 | Fermon et al. |
| 2009/0212765 A1 | 8/2009 | Doogue et al. |
| 2009/0243601 A1 | 10/2009 | Feldtkeller |
| 2009/0251134 A1 | 10/2009 | Uenoyama |
| 2009/0256552 A1 | 10/2009 | Guo et al. |
| 2009/0315543 A1 | 12/2009 | Guo et al. |
| 2009/0315548 A1 | 12/2009 | Bonin |
| 2010/0033175 A1 | 2/2010 | Boeve et al. |
| 2010/0052667 A1 | 3/2010 | Kohama et al. |
| 2010/0053789 A1* | 3/2010 | Duric .......... G01R 33/096 324/252 |
| 2010/0072988 A1 | 3/2010 | Hammerschmidt et al. |
| 2010/0141249 A1 | 6/2010 | Ararao et al. |
| 2010/0188078 A1 | 7/2010 | Foletto et al. |
| 2010/0201356 A1 | 8/2010 | Koller et al. |
| 2010/0207620 A1 | 8/2010 | Gies |
| 2010/0211347 A1 | 8/2010 | Friedrich et al. |
| 2010/0264909 A1 | 10/2010 | Scheller et al. |
| 2010/0276769 A1 | 11/2010 | Theuss et al. |
| 2010/0295140 A1 | 11/2010 | Theuss et al. |
| 2010/0330708 A1 | 12/2010 | Engel et al. |
| 2011/0004278 A1 | 1/2011 | Aghassian et al. |
| 2011/0018533 A1 | 1/2011 | Cesaretti et al. |
| 2011/0031960 A1 | 2/2011 | Hohe et al. |
| 2011/0050220 A1 | 3/2011 | Bootle et al. |
| 2011/0087456 A1 | 4/2011 | Satou et al. |
| 2011/0127998 A1 | 6/2011 | Elian et al. |
| 2011/0187354 A1 | 8/2011 | Zieren et al. |
| 2011/0224537 A1 | 9/2011 | Brunner |
| 2011/0248711 A1 | 10/2011 | Ausserlechner |
| 2011/0267040 A1 | 11/2011 | Frachon |
| 2011/0285384 A1 | 11/2011 | Nomura |
| 2011/0298447 A1 | 12/2011 | Foletto et al. |
| 2012/0019236 A1 | 1/2012 | Tiernan et al. |
| 2012/0019239 A1 | 1/2012 | Decitre |
| 2012/0062215 A1 | 3/2012 | Ide et al. |
| 2012/0274563 A1 | 11/2012 | Olsson |
| 2012/0280679 A1 | 11/2012 | Shelton |
| 2012/0293167 A1 | 11/2012 | Kitanaka et al. |
| 2012/0303305 A1 | 11/2012 | Bergqvist et al. |
| 2012/0326643 A1 | 12/2012 | Brannen |
| 2013/0015843 A1 | 1/2013 | Doogue et al. |
| 2013/0113474 A1 | 5/2013 | Elian |
| 2013/0147470 A1 | 6/2013 | Mulholland et al. |
| 2013/0147642 A1 | 6/2013 | Rubio et al. |
| 2013/0207648 A1 | 8/2013 | Zibold et al. |
| 2013/0214777 A1 | 8/2013 | Itoi |
| 2013/0241543 A1 | 9/2013 | Stenson et al. |
| 2013/0249029 A1 | 9/2013 | Vig et al. |
| 2013/0249544 A1 | 9/2013 | Vig et al. |
| 2013/0261990 A1 | 10/2013 | Ura |
| 2013/0278246 A1 | 10/2013 | Stegerer et al. |
| 2013/0300401 A1 | 11/2013 | Krapf et al. |
| 2013/0300402 A1 | 11/2013 | Liu et al. |
| 2013/0300406 A1 | 11/2013 | Pepka et al. |
| 2014/0184214 A1 | 7/2014 | Schäffer et al. |
| 2014/0327435 A1 | 11/2014 | Rohrer |
| 2014/0333295 A1 | 11/2014 | Fernandez et al. |
| 2015/0022187 A1 | 1/2015 | Taylor et al. |
| 2015/0022193 A1 | 1/2015 | Burdette et al. |
| 2015/0022197 A1 | 1/2015 | David et al. |
| 2015/0022198 A1 | 1/2015 | David et al. |
| 2015/0211895 A1 | 7/2015 | Reitsma et al. |
| 2015/0236869 A1 | 8/2015 | Vreeland et al. |
| 2015/0323612 A1 | 11/2015 | Latham |
| 2015/0326158 A1 | 11/2015 | Furlan et al. |
| 2015/0346290 A1 | 12/2015 | Holm et al. |
| 2016/0061863 A1 | 3/2016 | Zhang |
| 2016/0069662 A1 | 3/2016 | Mullenix et al. |
| 2016/0123771 A1 | 5/2016 | David et al. |
| 2016/0123774 A1 | 5/2016 | Foletto et al. |
| 2016/0139229 A1 | 5/2016 | Petrie et al. |
| 2016/0139230 A1 | 5/2016 | Petrie et al. |
| 2016/0169983 A1 | 6/2016 | Chang et al. |
| 2016/0339948 A1 | 11/2016 | Nakamura et al. |
| 2017/0131366 A1 | 5/2017 | Motz et al. |
| 2017/0234702 A1 | 8/2017 | Tima et al. |
| 2017/0248445 A1 | 8/2017 | Ausserlechner |
| 2018/0340986 A1 | 11/2018 | Latham et al. |
| 2018/0340990 A1 | 11/2018 | Latham et al. |
| 2018/0356474 A1 | 12/2018 | Hammerschmidt et al. |
| 2019/0079146 A1* | 3/2019 | Romero .......... H10N 52/80 |
| 2019/0383646 A1 | 12/2019 | Lassalle-Balier et al. |
| 2022/0236347 A1* | 7/2022 | Romero .......... G01R 33/0041 |
| 2022/0342007 A1 | 10/2022 | Latham et al. |
| 2023/0204693 A1* | 6/2023 | Romero .......... G01R 33/0041 324/207.21 |
| 2023/0314176 A1* | 10/2023 | Motz .............. G01D 5/145 324/207.2 |
| 2023/0375644 A1 | 11/2023 | Latham et al. |
| 2024/0255592 A1 | 8/2024 | Jaiswal et al. |

FOREIGN PATENT DOCUMENTS

| | | |
|---|---|---|
| CN | 102323554 A | 1/2012 |
| CN | 102331587 A | 1/2012 |
| CN | 102483443 A | 5/2012 |
| CN | 102713654 A | 10/2012 |
| CN | 102954808 A | 3/2013 |
| CN | 105021864 A | 11/2015 |
| CN | 105378500 A | 3/2016 |

(56) References Cited

FOREIGN PATENT DOCUMENTS

| | | |
|---|---|---|
| DE | 25 18 054 | 11/1976 |
| DE | 40 31 560 A | 4/1992 |
| DE | 195 39 458 A1 | 4/1997 |
| DE | 196 34 715 A1 | 3/1998 |
| DE | 196 50 935 A1 | 6/1998 |
| DE | 198 38 433 | 3/1999 |
| DE | 198 51 839 A1 | 11/1999 |
| DE | 199 61 504 A1 | 6/2001 |
| DE | 102 10 184 | 9/2003 |
| DE | 103 14 602 A1 | 10/2004 |
| DE | 10 2006 037 226 A1 | 2/2008 |
| DE | 10 2007 018 238 A1 | 10/2008 |
| DE | 10 2007 041 230 B3 | 4/2009 |
| DE | 10 2010 016 584 | 11/2010 |
| DE | 10 2011 102483 | 11/2012 |
| EP | 0 289 414 A2 | 11/1988 |
| EP | 0 289 414 A3 | 11/1988 |
| EP | 0 357 013 A2 | 3/1990 |
| EP | 0 357 013 A3 | 3/1990 |
| EP | 0 361 456 A2 | 4/1990 |
| EP | 0 361 456 A3 | 4/1990 |
| EP | 0 629 834 A1 | 12/1994 |
| EP | 0 680 103 A1 | 11/1995 |
| EP | 0 898 180 A2 | 2/1999 |
| EP | 0 944 888 | 9/1999 |
| EP | 1 306 687 A2 | 5/2003 |
| EP | 1 443 332 A1 | 8/2004 |
| EP | 1 580 560 A1 | 9/2005 |
| EP | 1 637 898 A1 | 3/2006 |
| EP | 1 662 353 A1 | 5/2006 |
| EP | 1 679 524 A1 | 7/2006 |
| EP | 1 797 496 | 6/2007 |
| EP | 1 850 143 A1 | 10/2007 |
| EP | 2 063 229 | 5/2009 |
| EP | 2 402 719 | 1/2012 |
| EP | 2 685 273 A1 | 1/2014 |
| EP | 3 139 190 A1 | 8/2017 |
| FR | 2 748 105 A1 | 10/1997 |
| FR | 2 909 756 | 6/2008 |
| GB | 2 135 060 A | 8/1984 |
| GB | 2 276 727 A | 10/1994 |
| GB | 2 481 482 | 12/2011 |
| JP | S5771504 A | 5/1982 |
| JP | 60-152950 | 8/1985 |
| JP | S60182503 A | 9/1985 |
| JP | 61-48777 | 3/1986 |
| JP | S 63-67583 A | 3/1988 |
| JP | 363 084176 A | 4/1988 |
| JP | 63 -263782 | 10/1988 |
| JP | 63-300911 | 12/1988 |
| JP | H02-116753 | 5/1990 |
| JP | H03-29817 | 2/1991 |
| JP | H0335182 A | 2/1991 |
| JP | H04-095817 | 3/1992 |
| JP | H06-273437 | 9/1994 |
| JP | H 07/128295 A | 5/1995 |
| JP | 08-097486 | 4/1996 |
| JP | H08-511348 A | 11/1996 |
| JP | 09-166612 | 6/1997 |
| JP | H 09/292471 A | 11/1997 |
| JP | 10-332725 | 12/1998 |
| JP | H10-318784 A | 12/1998 |
| JP | 11-064363 | 3/1999 |
| JP | 11-074142 | 3/1999 |
| JP | 2000-183241 | 6/2000 |
| JP | 2001-043475 A | 2/2001 |
| JP | 2001-141738 | 5/2001 |
| JP | 2001-165702 A | 6/2001 |
| JP | 2002-117500 A | 4/2002 |
| JP | 2002-149013 A | 5/2002 |
| JP | 2002-357920 A | 12/2002 |
| JP | 2003-177171 | 6/2003 |
| JP | 2003-202365 A | 7/2003 |
| JP | 2003-240759 A | 8/2003 |
| JP | 2003-287439 A | 10/2003 |
| JP | 2004-055932 | 2/2004 |
| JP | 2004-093381 | 3/2004 |
| JP | 2004-152688 | 5/2004 |
| JP | 2004-356338 | 12/2004 |
| JP | 2004-357858 A | 12/2004 |
| JP | 2005-517928 | 6/2005 |
| JP | 2005-337866 | 12/2005 |
| JP | 2005-345302 | 12/2005 |
| JP | 2006-003096 A | 1/2006 |
| JP | 2006-003116 A | 1/2006 |
| JP | 2006-275764 | 10/2006 |
| JP | 2006-284466 A | 10/2006 |
| JP | 2007-012582 A | 1/2007 |
| JP | 2007-218799 | 8/2007 |
| JP | 2007-240202 | 9/2007 |
| JP | 2008-180550 | 8/2008 |
| JP | 2008-264569 | 11/2008 |
| JP | 2008-286667 A | 11/2008 |
| JP | 2009-002911 A | 1/2009 |
| JP | 2009-222524 | 10/2009 |
| JP | 2009-250725 A | 10/2009 |
| JP | 2009-250931 A | 10/2009 |
| JP | 2010-537207 A | 12/2010 |
| JP | 2011-086479 | 4/2011 |
| JP | 2012-501446 A | 1/2012 |
| KR | 2012-0040247 A | 4/2012 |
| KR | 2013 0019872 A | 2/2013 |
| WO | WO 88/09026 | 11/1988 |
| WO | WO 94/29672 A1 | 12/1994 |
| WO | WO 96/02849 A1 | 2/1996 |
| WO | WO 1999/49322 | 9/1999 |
| WO | WO 2001/74139 | 10/2001 |
| WO | WO 2003/069358 A2 | 8/2003 |
| WO | WO 2003/069358 A3 | 8/2003 |
| WO | WO 2003/107018 A1 | 12/2003 |
| WO | WO 2004/027436 | 4/2004 |
| WO | WO 2004/072672 A1 | 8/2004 |
| WO | WO 2005/013363 A2 | 2/2005 |
| WO | WO 2005/013363 A3 | 2/2005 |
| WO | WO 2006/035342 | 4/2006 |
| WO | WO 2006/056829 | 6/2006 |
| WO | WO 2006/083479 | 8/2006 |
| WO | WO 2007/095971 A1 | 8/2007 |
| WO | WO 2007/138508 A1 | 12/2007 |
| WO | WO 2008/008140 A2 | 1/2008 |
| WO | WO 2008/048379 A1 | 4/2008 |
| WO | WO 2008/121443 A1 | 10/2008 |
| WO | WO 2008/145662 A1 | 12/2008 |
| WO | WO 2009/108422 A2 | 9/2009 |
| WO | WO 2010/014309 A1 | 2/2010 |
| WO | WO 2010/027658 A2 | 3/2010 |
| WO | WO 2010/065315 A1 | 6/2010 |
| WO | WO 2010/096367 A1 | 8/2010 |
| WO | WO 2011/011479 A1 | 1/2011 |
| WO | WO 2012/148646 A1 | 11/2012 |
| WO | WO 2013/169455 | 11/2013 |
| WO | WO 2014/105302 A1 | 7/2014 |
| WO | WO 2015/009442 A1 | 1/2015 |
| WO | WO2015/058733 A1 | 4/2015 |

OTHER PUBLICATIONS

Ahn et al.; "A New Toroidal-Meander Type Integrated Inductor with a Multilevel Meander Magnetic Core;" IEEE Transaction on Magnetics; vol. 30; No. 1; Jan. 1, 1994; 7 pages.

Allegro "Two-Wire True Zero Speed Miniature Differential Peak-Detecting Gear Tooth Sensor;" ATS645LSH; 2004; Allegro MicroSystems, Inc., Worcester, MA 01615; 14 pages.

Allegro Microsystems, Inc., "Gear-Tooth Sensor For Automotive Applications," Aug. 3, 2001; 2 pages.

Allegro MicroSystems, Inc., Hall-Effect IC Applications Guide, http://www.allegromicro.com/en/Products/Design/an/an27701.pdf, Copyright 1987, 1997; 36 pages.

Allegro "True Zero-Speed Low-Jitter High Accuracy Gear Tooth Sensor;" ATS625LSG; 2005; Allegro MicroSystems, Inc. Worcester, MA 01615; 21 pages.

(56) References Cited

OTHER PUBLICATIONS

Ausserlechner et al.; "Compensation of the Piezo-Hall Effect in Integrated Hall Sensors on (100)-Si;" IEEE Sensors Journal, vol. 7, No. 11; Nov. 2007; ISBN: 1530-437X; 8 pages.

Ausserlechner et al.; "Drift of Magnetic Sensitivity of Small Hall Sensors Due to Moisture Absorbed by the IC-Package;" Proceedings of IEEE Sensors, 2004; vol. 1; Oct. 24, 2004; ISBN:0-7803-8692-2; 4 pages.

Ausserlechner; "Limits of Offset Cancellation by the Principle of Spinning Current Hall Probe;" Proceedings of IEEE Sensors; Oct. 2004; 4 pages.

Ausserlechner; "The piezo-Hall effect in n-silicon for arbitrary crystal orientation;" Proceedings of IEEE Sensors; vol. 3; Oct. 24, 2004; ISBN: 0-7803-8692-2; 4 pages.

Bahreyni, et al.; "A Resonant Micromachined Magnetic Field Sensor;" IEEE Sensors Journal; vol. 7, No. 9, Sep. 2007; 9 pages.

Barrettino, et al.; "CMOS-Based Monolithic Controllers for Smart Sensors Comprising Micromembranes and Microcantilevers;" IEEE Transactions on Circuits and Systems-I Regular Papers vol. 54, No. 1; Jan. 2007; 12 pages.

Baschirotto et al.; "Development and Analysis of PCB Vector 2-D Magnetic Field Sensor System for Electronic Compass;" IEEE Sensors Journal vol. 6, No. 2; Apr. 2006; 7 pages.

Bilotti et al.; "Monolithic Magnetic Hall Sensor Using Dynamic Quadrature Offset Cancellation;" IEEE Journal of Solid-State Circuits; vol. 32, Issue 6; Jun. 1997; 8 pages.

Bowers et al., "Microfabrication and Process Integration of Powder-Based Permanent Magnets", Interdisciplinary Microsystems Group, Dept. Electrical and Computer Engineering, University of Florida, USA; Technologies for Future Micro-Nano Manufacturing Workshop, Napa, California, August 8-10; 4 pages.

Daughton J: "Spin-dependent sensors", Proceedings of the IEEE New York, US, vol. 91. No.5 May 1, 2003; 6 pages.

Demierre, et al.; "Reference Magnetic Actuator for Self-Calibration of a Very Small Hall Sensor Array;" Sensors and Actuators A97-98; Apr. 2002; 8 pages.

Dwyer, "Back-Biased Packaging Advances (SE, SG & SH versus SA & SB)," http://www.allegromicro.com/en/Products/Design/packaging_advances/index.asp, Copyright 2008; 5 pages.

Frick, et al.; "CMOS Microsystem for AC Current Measurement with Galvanic Isolation;" IEEE Sensors Journal; vol. 3, No. 6; Dec. 2003; 9 pages.

Halg; "Piezo-Hall Coefficients of n-Type Silicon;" Journal of Applied Physics; vol. 64, No. 1; Jul. 1, 1988; 7 pages.

Honeywell International, Inc., "Hall Effect Sensing and Application," Micro Switch Sensing and Control, Chapter 3, http://content.honeywell.com/sensing/prodinfo/solidstate/technical/hallbook.pdf, date unavailable but believed to be before Jan. 2008; 11 pages.

Hosticka; "CMOS Sensor Systems;" Sensors and Actuators A66; Apr. 1998; 7 pages.

Infineon Product Brief, TLE 4941plusC, Differential Hall IC for Wheel Speed Sensing, Oct. 2010, www.infineon.com/sensors, 2 pages.

Johnson et al., "Hybrid Hall Effect Device," Appl. Phys. Lett., vol. 71, No. 7, Aug. 1997; 3 pages.

Kanda et al.; "The Piezo-Hall Effect in n-Silicon;" $22^{nd}$ International Conference on the Physics of Semiconductors; vol. 1, Jan. 1995; 4 pages.

Kapser et al.; "Integrated GMR Based Wheel Speed Sensor for Automotive Applications;" IEEE 2007 Conference on Sensors; Oct. 2007; 4 pages.

Kammerer et al.: "A Hall effect sensors network insensitive to mechanical stress;" Proceedings of IEEE Sensors; vol. 3, Oct. 2004; 4 pages.

Lagorce et al.; "Magnetic and Mechanical Properties of Micromachined Strontium Ferrite/Polyimide Composites;" Journal of Microelectromechanical Systems; vol. 6, No. 4; Dec. 1997; 6 pages.

Lequesne et al.; "High-Accuracy Magnetic Position Encoder Concept;" IEEE Transactions on Industry Applications; vol. 35, No. 3; May/Jun. 1999; 9 pages.

Magnani et al.; "Mechanical Stress Measurement Electronics Based on Piezo-Resistive and Piezo-Hall Effects;" $9^{th}$ International Conference on Electronics, Circuits and Systems 2002; vol. 1; SBN: 0-7803-7596-3; Dec. 2002; 4 pages.

Manic et al.; "Short and Long-Term Stability Problems of Hall Plates in Plastic Packages;" IEEE $38^{th}$ Annual International Reliability Physics Symposium; Apr. 2000; 6 pages.

Manic; "Drift in Silicon Integrated Sensors and Circuits Due to the Thermo-Mechanical Stresses;" Lausanne, École Polytechnique Fédérale De Lausanne 2000; 176 pages.

Melexis Microelectronic Systems, Hall Applications Guide, Section 3—Applications, 1997; 40 pages.

Motz et al.; "An Integrated Magnetic Sensor with Two Continuous-Time $\Delta\Sigma$-Converters and Stress Compensation Capability;" IEEE International Solid-State Circuits Conference; Digest of Technical Papers; Feb. 6, 2006; ISBN: 1-4244-0079-1; 7 pages.

Motz, et al.; "A Chopped Hall Sensor with Small Jitter and Programmable "True Power-On" Function;" IEEE Journal of Solid-State Circuits; vol. 40, No. 7; Jul. 2005; 8 pages.

Motz, et al.; "An Integrated Hall Sensor Platform Design for Position, Angle and Current Sensing;" IEEE Sensors 2006; Exco, Daegu, Korea / Oct. 22-25, 2006; 4 pages.

Munter; "A Low-offset Spinning-current Hall Plate;" Sensors and Actuators A21-A23; 1990; 4 pages.

Munter; "Electronic Circuitry for a Smart Spinning-current Hall Plate with Low Offset;" Sensors and Actuators A; Jun. 1991; 5 pages.

Oniku et al.; "High-Energy-Density Permanent Micromagnets Formed from Heterogeneous Magnetic Powder Mixtures;" IEEE 25th International Conference on Micro Electro Mechanical Systems, Jan. 2012; 4 pages.

Park et al.; "Ferrite-Based Integrated Planar Inductors and Transformers Fabricated at Low Temperature;" IEEE Transactions on Magnetics; vol. 33; No. 5; Sep. 1997; 3 pages.

Park et al.;"Batch-Fabricated Microinductors with Electroplated Magnetically Anisotropic and Laminated Alloy Cores", IEEE Transactions on Magnetics, vol. 35, No. 5, Sep. 1999, 10 pages.

Partin et al.; "Temperature Stable Hall Effect Sensors;" IEEE Sensors Journal, vol. 6, No. 1; Feb. 2006; 5 pages.

Pastre, et al.; "A Hall Sensor Analog Front End for Current Measurement with Continuous Gain Calibration;" IEEE Sensors Journal; vol. 7, No. 5; May 2007; 8 pages.

Pastre, et al.; "A Hall Sensor-Based Current Measurement Microsystem With Continuous Gain Calibration;" Research in Microelectronics and Electronics, IEEE vol. 2; Jul. 25; 2005; ISBN: 0-7803-9345-7; 4 pages.

Popovic; "Sensor Microsystems;" Proc. $20^{th}$ International Conference on Microelectronics (MWIL 95); vol. 2, NIS, Serbia, 12-14; Sep. 1995; 7 pages.

Randhawa; "Monolithic Integrated Hall Devices in Silicon Circuits;" Microelectronics Journal; vol. 12, No. 6; Sep. 14-17, 1981; 6 pages.

Ruther et al.; "Integrated CMOS-Based Sensor Array for Mechanical Stress Mapping;" $5^{th}$ IEEE Conference on Sensors, Oct. 2007; 4 pages.

Ruther et al.; "Thermomagnetic Residual Offset in Integrated Hall Plates;" IEEE Sensors Journal; vol. 3, No. 6; Dec. 2003; 7 pages.

Sargent; "Switched-capacitor IC controls feedback loop;" EDN; Design Ideas; Feb. 17, 2000; 2 pages.

Schneider; "Temperature Calibration of CMOS Magnetic Vector Probe for Contactless Angle Measurement System," IEDM 1996 4 Pages.

Schott et al.; "Linearizing Integrated Hall Devices;" 1997 International Conference on Solid-State Sensors and Actuators, Jun. 16-19, 1997; 4 Pages.

Schott, et al.; "CMOS Single-Chip Electronic Compass with Microcontroller;" IEEE Journal of Solid-State Circuits; vol. 42, No. 12; Dec. 2007; 11 pages.

Simon et al.; "Autocalibration of Silicon Hall Devices;" $8^{th}$ International Conference on Solid-State Sensors and Actuators; vol. 2; Jun. 25, 1995; 4 pages.

(56) References Cited

OTHER PUBLICATIONS

Smith et al.; "Low Magnetic Field Sensing with GMR Sensors;" Sensor Magazine; Part 1; Sep. 1999; http://archives.sensorsmag.com/articles/0999/76mail.shtml; pp. 1-8.

Smith et al.; "Low Magnetic Field Sensing with GMR Sensors;" Sensor Magazine; Part 2; Oct. 1999; http://archives.sensorsmag.com/articles/1099/84/mail.shtml; pp. 1-11.

Steiner et al.; "Double-Hall Sensor with Self-Compensated Offset;" International Electron Devices Meeting; Dec. 7, 1997; ISBN: 0-7803-4100-7; 4 pages.

Steiner et al; Offset Reduction in Hall Devices by Continuous Spinning Current Method; Sensors and Actuators A66; 1998; 6 pages.

Stellrecht et al.; Characterization of Hygroscopic Swelling Behavior of Mold Compounds and Plastic Packages; IEEE Transactions on Components and Packaging Technologies; vol. 27, No. 3; Sep. 2004; 8 pages.

Tian et al.; "Multiple Sensors on Pulsed Eddy-Current Detection for 3-D Subsurface Crack Assessment;" IEEE Sensors Journal, vol. 5, No. 1; Feb. 2005; 7 pages.

Trontelj et al; "CMOS Integrated Magnetic Field Source Used as a Reference in Magnetic Field Sensors on Common Substrate;" WEP 1-6; IMTC; May 1994; 3 pages.

Udo; "Limits of Offset Cancellation by the Principle of Spinning Current Hall Probe;" Proceedings of IEEE Sensors; Oct. 2004; 4 pages.

Wu, et al.; "A Chopper Current-Feedback Instrumentation Amplifier with a 1mHz 1/f Noise Corner and an AC-Coupled Ripple-Reduction Loop;" IEEE International Solid-State Circuits Conference; Feb. 10, 2009; 3 pages.

Zou et al.; "Three-Dimensional Die Surface Stress Measurements in Delaminated and Non-Delaminated Plastic Packages;" 48th Electronic Components and Technology Conference; May 25, 1998; 12 pages.

\* cited by examiner

CLOSED LOOP MAGNETIC FIELD SENSOR WITH CURRENT CONTROL

BACKGROUND

Magnetic field sensors utilize magnetic field sensing elements to detect one or more magnetic fields. Magnetic field sensors are often used to detect a ferromagnetic or conductive target and may generally act to detect motion or position of the target. Such sensors are found in many technology areas including robotics, automotive, manufacturing and so forth. For example, a magnetic field sensor may be used to detect when a vehicle wheel locks up (stops rotating), which triggered the vehicle's control processor to engage an anti-lock braking system. Magnetic field sensors may also detect distance to an object. As examples, magnetic field sensors may be used to detect the position of a hydraulic piston or angular position of a steering column.

A magnetic field sensing element may be a single element or, alternatively, may include two or more magnetic field sensing elements arranged in various configurations, e.g., a half-bridge or full-bridge (Wheatstone) configuration. Depending on the device type and/or other application requirements, a magnetic field sensing element may include, e.g., a type IV semiconductor material such as Silicon (Si) or Germanium (Ge), or a type III-V semiconductor material like Gallium-Arsenide (GaAs) or an Indium compound, e.g., Indium-Antimonide (InSb).

Hall effect elements are one type of magnetic field sensing elements that generate a variable voltage in response to changes in an applied or sensed magnetic field. Magnetoresistance elements are another type of magnetic field sensing element that has a variable resistance that changes in response to changes in an applied or sensed magnetic field. There are different types of magnetoresistance elements, for example, semiconductor magnetoresistance elements such as ones including Indium Antimonide (InSb), anisotropic magnetoresistance (AMR) elements, giant magnetoresistance (GMR) elements, and tunneling magnetoresistance (TMR) elements, which are also referred to as magnetic tunnel junction (MTJ) elements. Some magnetoresistance elements, e.g., GMR and TMR elements, may have a limited linear output range in which a change in sensed magnetic field intensity is linear with respect to a corresponding change in the resistance of the elements.

SUMMARY

Example embodiments of the disclosure provide methods and apparatus for a coil activated position sensor (CAPS) having current consumption control. In example embodiments, a sensor includes a reference coil and an emitter coil driver, which are in the feedback path of the closed loop sensor. With this arrangement, air gap distance, for example, can correspond to emitter coil current level used for sensing targets.

In one aspect, a magnetic field sensor comprises: an emitter coil drive circuit for outputting an emitter current to an emitter coil for generating an emitter field; a reference coil drive circuit for outputting a reference current to a reference coil for generating a reference field; a combiner to combine a reflected field generated by a target in response to the emitter field and the reference field and output an applied field; a magnetic field sensing element to receive the applied field and generate an electric signal; an amplifier to amplify the electric signal, wherein an output of the amplifier is coupled to the emitter coil drive circuit; a transconductance module to generate an output current from the electric signal; wherein the sensor comprises a closed loop configuration with a feedback path that includes the emitter coil drive circuit and the emitter coil and is configured to modify an amplitude of the emitter current signal based on a distance from the target to the magnetic field sensing element.

A sensor can further comprise one or more of the following features: the applied field comprises a signal at carrier frequency, the output signal from the magnetic field sensing element is demodulated to a baseband frequency and input to the amplifier, the distance d is determined as:

$$d = K_{EC}^{-1}\left(\frac{I_{RC} \cdot K_{RC}}{I_O \cdot K}\right),$$

where Io is the output current from the transconductance module, $I_{RC}$ is the reference current,

| | | |
|---|---|---|
| $K_{EC}(d)$ | [G/A] | Ratio between the emitting coil current IEC and the reflected magnetic field BR |
| $K_{FC}$, $K_{RC}$ | [G/A] | Feedback and reference coils sensitivity |
| K | [A/A] | Transconductances ratio | the emitter current is determined as:

$$I_{EC} = I_{RC} \cdot K_{RC} \cdot \frac{1}{K_{EC}(d)},$$

where $I_{RC}$ is the reference current, and

| | | |
|---|---|---|
| $K_{EC}(d)$ | [G/A] | Ratio between the emitting coil current $I_{EC}$ and the reflected magnetic field BR |
| $K_{FC}$, $K_{RC}$ | [G/A] | Feedback and reference coils sensitivity | the magnetic field sensing element comprises a magnetoresistance (MR) element, and/or the magnetic field sensing element comprises a Hall element.

In another aspect, a method comprises outputting an emitter current to an emitter coil for generating an emitter field; outputting a reference current to a reference coil for generating a reference field; combining a reflected field generated by a target in response to the emitter field and the reference field and output an applied field; receiving the applied field and generating an electric signal by a magnetic field sensing element in a magnetic field sensor; amplifying the electric signal with an amplifier, wherein an output of the amplifier is coupled to an emitter coil drive circuit for generating the emitter current; and generating an output current from the electric signal, wherein the sensor comprises a closed loop configuration with a feedback path that includes the emitter coil drive circuit and the emitter coil and is configured to modify an amplitude of the emitter current signal based on a distance from the target to the magnetic field sensing element.

A method can further include one or more of the following features: the applied field comprises a signal at carrier frequency, the output signal from the magnetic field sensing element is demodulated to a baseband frequency and input to the amplifier, the distance d is determined as:

$$d = K_{EC}^{-1}\left(\frac{I_{RC} \cdot K_{RC}}{I_O \cdot K}\right),$$

where Io is the output current from the transconductance module, $I_{RC}$ is the reference current,

| | | |
|---|---|---|
| $K_{EC}(d)$ | [G/A] | Ratio between the emitting coil current IEC and the reflected magnetic field BR |
| $K_{FC}$, $K_{RC}$ | [G/A] | Feedback and reference coils sensitivity |
| K | [A/A] | Transconductances ratio | the emitter current is determined as:

$$I_{EC} = I_{RC} \cdot K_{RC} \cdot \frac{1}{K_{EC}(d)},$$

where $I_{RC}$ is the reference current, and

| | | |
|---|---|---|
| $K_{EC}(d)$ | [G/A] | Ratio between the emitting coil current $I_{EC}$ and the reflected magnetic field BR |
| $K_{FC}$, $K_{RC}$ | [G/A] | Feedback and reference coils sensitivity | the magnetic field sensing element comprises a magnetoresistance (MR) element, and/or the magnetic field sensing element comprises a Hall element.

In a further aspect, a magnetic field sensor comprises: an emitter coil drive circuit for outputting an emitter current to an emitter coil for generating an emitter field; a reference coil drive circuit for outputting a reference current to a reference coil for generating a reference field; a combiner to combine a reflected field generated by a target in response to the emitter field and the reference field and output an applied field; a magnetic field sensing element to receive the applied field and generate an electric signal; an amplifier to amplify the electric signal, wherein an output of the amplifier is coupled to the emitter coil drive circuit; a transconductance module to generate an output current from the electric signal; and a means for providing a closed loop feedback.

BRIEF DESCRIPTION OF THE DRAWINGS

The foregoing features of this disclosure, as well as the disclosure itself, may be more fully understood from the following description of the drawings in which.

DETAILED DESCRIPTION

Some introductory information is provided prior to describing example embodiments of the disclosure. A sensed magnetic field, referred to herein alternatively as the applied magnetic field, can be from an external magnetic field source or a reflected field and can be amplified and fed back to the magnetic field sensing elements, e.g., MR elements, by a feedback coil such that the magnetic field sensing elements operate in a linear range. The feedback configuration can be a negative feedback configuration, in exemplary embodiments.

As used herein, the term "magnetic field sensor" is used to describe a circuit that uses one or more magnetic field sensing elements, generally in combination with other circuits. Magnetic field sensors are used in a variety of applications, including, but not limited to, angle sensors that sense an angle of a direction of a magnetic field, current sensors that sense a magnetic field generated by a current carried by a current-carrying conductor, magnetic switches that sense the proximity of a ferromagnetic object, rotation detectors that sense passing ferromagnetic articles, for example, magnetic domains of a ring magnet or a ferromagnetic target (e.g., gear teeth) where the magnetic field sensor is used in combination with a back-biased or other magnet, and magnetic field sensors that sense a magnetic field density of a magnetic field.

As used herein, the term "target" is used to describe an object or portion of an object to be sensed or detected by a magnetic field sensor or a magnetic field sensing element such as a magnetoresistance element. The target may include a conductive material that allows for eddy currents to flow within the target.

Figure 1:
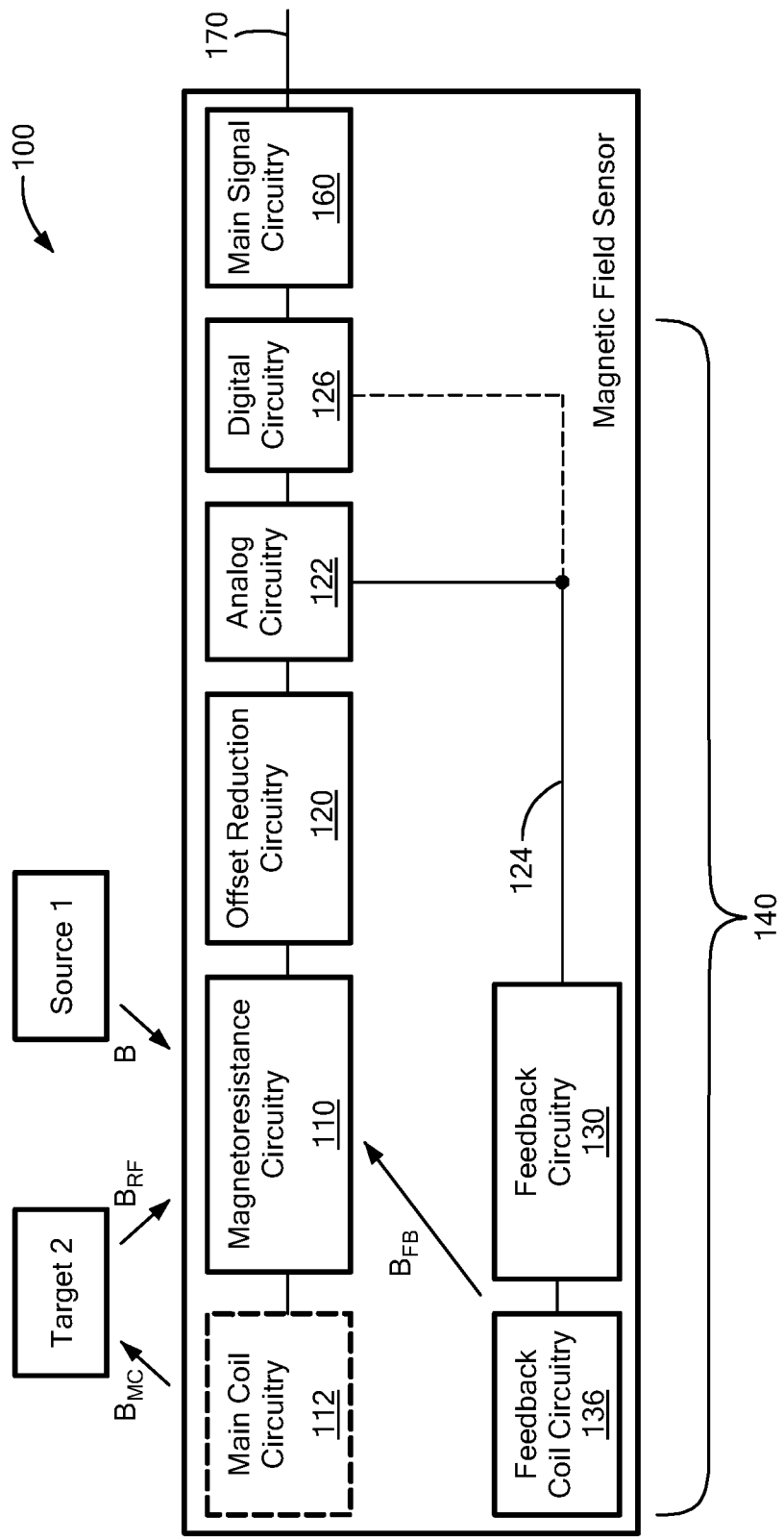
FIG. 1 is a block diagram of an example magnetic field sensor having for detecting an applied magnetic field.

FIG. 1 is a block diagram of an example of a magnetic field coil activated position sensor (CAPS) 100. Magnetic field sensor 100 includes magnetoresistance circuitry 110 that is part of a magnetic closed loop (a.k.a., feedback loop) 140 including feedback circuitry 130 and feedback coil circuitry 136 that generates a feedback magnetic field ($B_{FB}$).

The magnetoresistance circuitry 110 is configured to sense or detect one or more magnetic fields, including a residual magnetic field (a.k.a., a resultant or error magnetic field) resulting from a combination of an external applied (B) or reflected ($B_{RF}$) magnetic field, which may be modulated at a first frequency ($f_1$), and the feedback magnetic field ($B_{FB}$). Magnetoresistance elements 110 can have relatively poor signal to offset ratios and, in fact, can have offset levels that are much larger than the maximum signal to be sensed.

Offset reduction circuitry 120 is responsive to the magnetoresistance circuitry 110 and is configured to reduce undesired baseband components such as components attributable to the magnetoresistance circuitry 110. Example offset reduction circuitry 120 can take the form of AC coupling circuitry as shown and described in connection with FIG. 2. The offset reduction circuitry 110 prevents undesired DC signal components from creating high frequency ripple, which would undesirably generate excessive power consumption due to current through the feedback coil and would increase the dynamic residual offset and thus, reduce the dynamic range of the system. Thus, stated differently, the offset reduction circuitry 120 prevents such ripple generation, thus optimizing power consumption, minimizing residual offset and maximizing output dynamic range (i.e., ensuring that the dynamic range of the system is available for processing the useful signal).

Sensor 100 can also include analog circuitry 122, e.g., one or more amplifiers, and digital circuitry 126, e.g., one or more filters, which can be used to process and/or condition the output signals of the offset reduction circuitry 120 to generate a feedback signal 124. The closed loop 140 is configured to use the feedback signal 124 to generate the feedback magnetic field ($B_{FB}$) and supply the feedback magnetic field ($B_{FB}$) to the magnetoresistance circuitry 110. The feedback loop 140 can be an analog closed loop as illustrated by the solid line feedback signal 124 from analog circuitry 122 or a digital closed loop as illustrated by the dotted line feedback signal 124 from the digital circuitry 126. It will be appreciated by those of ordinary skill in the art that, in the case of a digital feedback circuit, a DAC is provided (as may be part of the feedback circuitry 130) in order to convert the digital signal back to the analog domain in order to drive the coil.

Main signal circuitry 160 can process a main signal from the magnetoresistance circuitry 110, e.g., for measuring a position of a source 1 or target 2, in order to generate a sensor output signal 170 that can be indicative of the position and/or motion of the source 1 or target 2.

The applied magnetic field can be a magnetic field (B) generated by a magnetic field source 1 and/or a reflected magnetic field ($B_{RF}$) reflected from a target 2, e.g., a conductive target. In example embodiments, a target 2 may include, but is not limited to, a portion of a moving metal machine component such as a gear tooth, a camshaft lobe, a magnetic domain on a rotating shaft, or a magnetic domain on a rotating/moving element, etc. For embodiments sensing a reflected magnetic field ($B_{RF}$) reflected from a target 2, the sensed magnetic field can result from a main coil magnetic field (BMC) that is generated by a main coil as part of main coil circuitry 112 that is reflected from the target 2 as the reflected magnetic field ($B_{RF}$), with the reflected magnetic field allowing measurement of a parameter associated with the target 2.

Figure 2:
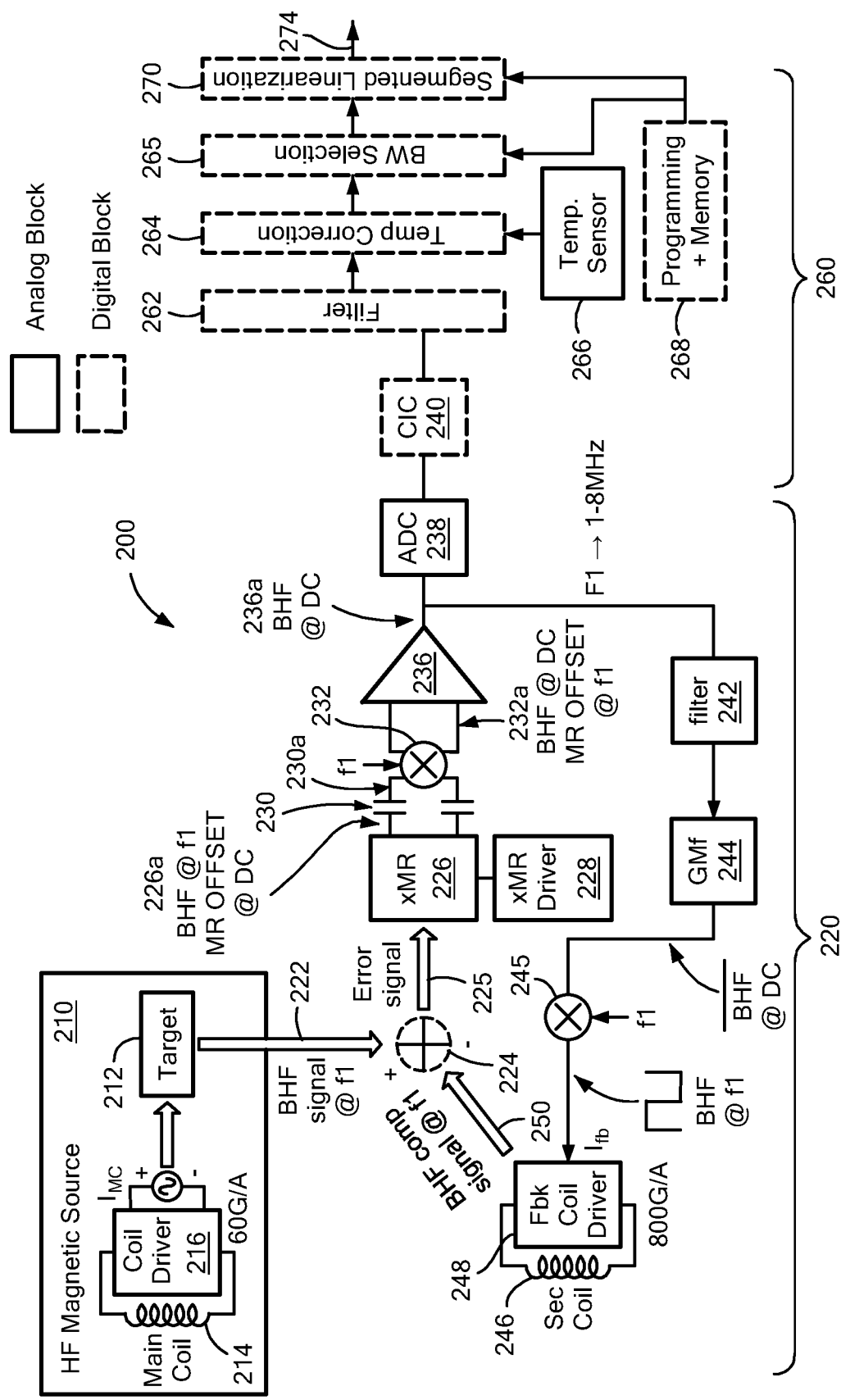
FIG. 2 shows an example implementation of the magnetic field sensor of FIG. 1.

FIG. 2 shows an example of a closed loop magnetic field sensor 200 for detecting an applied magnetic field (BHF) 222. The magnetic field sensor 200 includes a magnetic closed loop 220 including magnetoresistance circuitry 226, feedback circuitry 244, and a feedback coil 246 configured to generate a feedback magnetic field 250. The magnetoresistance circuitry 226 is configured to receive or detect a residual magnetic field 225 resulting from a combination of applied magnetic field 222 and feedback magnetic field 250 and produce a corresponding electrical output signal 226a, e.g., as a differential output voltage signal. Magnetoresistance circuitry 226 can be driven by a magnetoresistance driver 228. In example embodiments, the magnetoresistance circuitry 226 can include multiple magnetoresistance elements, e.g., four elements, in a bridge configuration.

Magnetic field 222 can be generated by a magnetic source 210 including a target 212 and a main coil 214 and driver 216. In this configuration, the applied field 222 can be a reflected magnetic field ($B_{RF}$) reflected from a conductive target 212. In example embodiments, target 212 may include, but is not limited to, a portion of a moving metal machine component such as a gear tooth, a camshaft lobe, a magnetic domain on a rotating shaft, or a magnetic domain on a rotating/moving element, etc. For embodiments sensing a reflected magnetic field ($B_{RF}$) reflected from a target 212, the sensed magnetic field can result from a main coil magnetic field (BMC) that is generated by the main coil 214 driven by driver 216 and that is then directed to and reflected from the target 212 as the reflected magnetic field ($B_{RF}$), with the reflected magnetic field allowing measurement of a position of the target. In such embodiments, the applied magnetic field 222 can include a signal having a relatively high frequency $f_1$ that is indicative of a useful signal of interest for processing by a main signal path 260 to generate an output signal 274 of the sensor 200.

In example embodiments, the feedback magnetic field 250 can be combined with the applied magnetic field 222 in a negative feedback configuration (as indicated by negative sign at 224) to form a residual magnetic field 225 that is near zero, e.g., in the linear operational range of the magnetoresistance circuitry 226. For example, by having opposite polarities, the applied magnetic field 222 and the feedback magnetic field 250 may sum to near zero. In alternate embodiments, the feedback magnetic field 250 can be combined with the applied magnetic field 222 in a negative feedback configuration with a large open loop gain, e.g., such that the residual magnetic field 225 is near zero. It is understood that this feedback is always negative.

Applied magnetic field 222 and feedback magnetic field 250 are indicated as being combined by sum unit 224, however an electronic sum unit 224 is not necessary for combination of the magnetic fields 222, 250 as they may be combined (e.g., be superposed) in any medium or in free space. For example, placement and/or geometry of sensing elements of magnetoresistance circuitry 226 with respect to the magnetic source 210 and feedback coil 246 can result in generation of the residual magnetic field 225 as the difference between the applied magnetic field 222 and the feedback magnetic field 250. As shown, when the fields are combined, feedback magnetic field 250 can be subtracted from applied magnetic field 222 to result in residual magnetic field 225.

The feedback magnetic field 250 generated by the feedback coil 246 can accordingly be used, in example embodiments, to reduce or attenuate the residual magnetic field such that the magnetoresistance circuitry 226 is operational in a linear region of the transfer function curve of the magnetoresistance elements. In example embodiments, the feedback magnetic field 250 can include a scaled replica of the applied magnetic field 222. Use of the feedback magnetic field 250 can accordingly allow the magnetoresistance circuitry 226 to be used in a linear range of operation and mitigate negative effects arising from undesirable signal components, for example, stray magnetic fields or by temperature or mechanical stresses that may be included in the applied magnetic field 222. The closed magnetic loop 220 can include one or more amplifiers 236 to provide a desired loop gain, without relying on the sensitivity or gain of the magnetoresistance circuitry 226.

Output signal 226a of the MR elements 226 can contain high frequency components of interest (i.e., components corresponding to the useful signal to be sensed) at the first frequency $f_1$ and undesirable offset components at baseband as may be attributable to offset of the MR elements 226.

Offset reduction circuitry 230 configured to reduce the undesired baseband components includes series coupled capacitors, as shown. Capacitors 230 block the undesired baseband components due to offset to thereby generate a signal 230a having little or no undesired baseband components.

A modulator 232 is coupled to the capacitors 230 and is configured to shift the frequency of the received signal so that an output signal 232a of the modulator 232 includes a baseband portion indicative of a useful signal of interest (referred to herein as a main signal portion) and any undesirable offset component at frequency $f_1$.

Amplifier 236 is coupled to receive the modulator output signal 232a and to amplify the signal in order to generate a superimposed signal 236a containing a main signal portion of interest at DC and an offset reduced signal portion (i.e., any remaining undesirable offset components) at frequency $f_1$. The superimposed signal 236a can be provided to feedback circuitry to drive feedback coil 246 and generate the feedback magnetic field 250. For example, the superimposed signal 236a can be filtered by a filter 242 and converted from a voltage to a current by a transconductance amplifier 244. Ideally, any undesirable offset components are significantly attenuated by the capacitors 230 and so that the superimposed signal 236a at the output of amplifier 236 contains only the main signal of interest at baseband and little to no high frequency components representing offset components; however, in the event that such high frequency undesirable offset components remain in signal 236a, they can be removed by low pass filter 242 for example.

A second modulator 245 can be coupled to receive the output current signal from the transconductance amplifier 244 and generate a feedback signal Ifb for coupling to the coil driver 248. Feedback coil driver 248 can generate the drive signal for the feedback coil 246 to generate the feedback magnetic field 250 based on the feedback signal.

It will be appreciated by those of ordinary skill in the art that although the magnetic feedback loop 220 shown in the embodiment of FIG. 2 is analog (i.e., the superimposed signal is analog and conversion to the digital domain is performed by ADC 238 for digital processing by the main signal path 260), in other embodiments the closed loop 220 can include digital signals and components (e.g., as illustrated by the dotted line in FIG. 1).

The superimposed signal 236a can also be provided to main signal path 260 for extracting the main signal component and producing an output signal 274 of the magnetic field sensor 200. The signal 236a may be provided to an analog-to-digital converter 238 to convert the signal 236a from an analog signal to a digital signal. One or more filters, e.g., cascaded integrator-comb (CIC) filter 240 and/or digital filter 262, may be included for filtering, as low pass filters to remove high frequency components.

Main signal path 260 can include a temperature correction circuit 264, a temperature sensor 266, a programming and memory circuit 268, a bandwidth selection block 265, and a segmented linearization block 270, providing main signal output 274. Temperature correction block 264 may scale the output voltage signal according to temperature, e.g., a temperature measured by the temperature sensor 266. Main signal path 260 can provide main signal output 274, which in example embodiments may be indicative of an angle or position or other parameter such as speed associated with the target 212.

Figure 3:
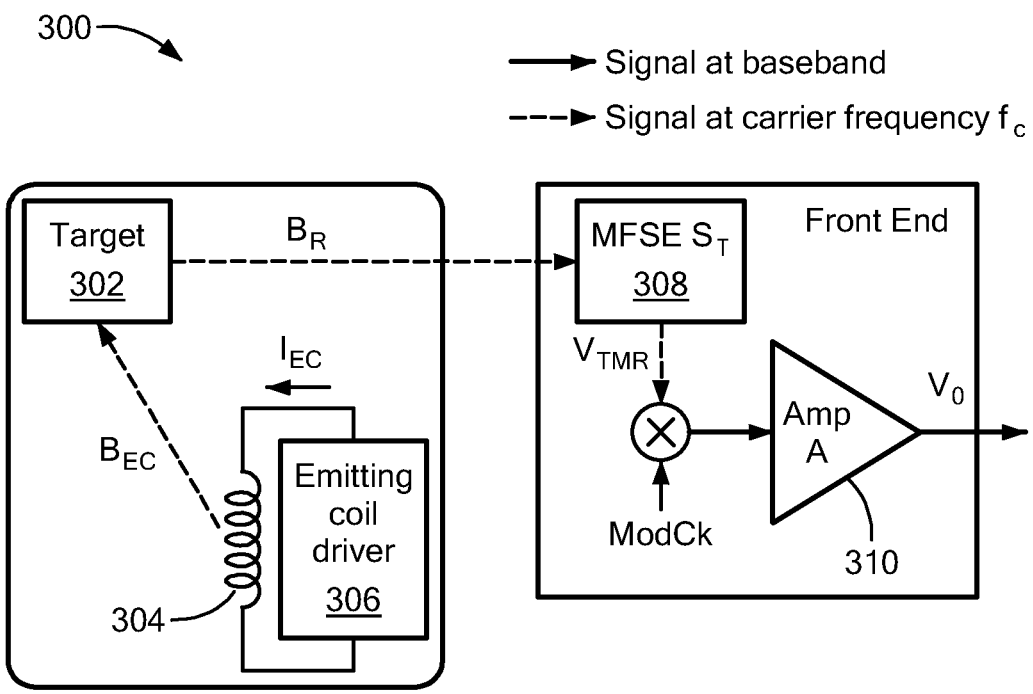
FIG. 3 is a schematic representation of an open loop magnetic field coil activated position sensor (CAPS)
Figure 3A:
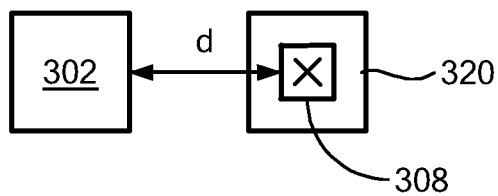
FIG. 3A shows an example distance d from a target to a sensing element on a die.

FIG. 3 shows a high level schematic representation of an open loop CAPS sensor 300 for sensing a target 302 distance d using a field $B_{EC}$ emitted by an emitting coil 304 controlled by a coil driver 306 that outputs a coil current $I_{EC}$. A field BR reflected by the target 302 is sensed by magnetic field sensing element(s) (MFSE) 308 having a given sensitivity $S_T$. An output voltage $V_{TMR}$ is combined with a clock signal ModCk and input to an amplifier 310 which generates an output voltage Vo that corresponds to the strength of field $B_R$. In embodiments, as shown in FIG. 3A, distance d can be defined as the distance from a surface of the target 302 closest to the MFSE 308 on a die 320 that can provide circuitry in addition to MFSE. In the illustrated embodiment, circuitry, such as amplifier 310 and MFSE 308, are shown in one section and magnetics, such as emitting coil 304 and target 302, are shown in a different section for ease of understanding. In example embodiments, a sensor IC package will be positioned in relation to the target.

The signal of interest (at base band) is modulated at the carrier frequency $f_c$ to generate eddy currents in the target 302. The relationship of the different system parameters can be represented in Equation (1) as follows:

$$V_O = I_{EC} \cdot K_{EC}(d) \cdot S_T \cdot A \qquad (1)$$

where $K_{EC} = B_R / I_{EC}$

Example parameters used in one or more of the equations used herein are set forth in the below table.

| Parameter | Magnitude | Description |
| --- | --- | --- |
| $B_R$ [1] | [G] | Reflected magnetic field |
| $B_{EC}$[2] | [G] | Emitted by the emitting coil magnetic field |
| $B_{FC}$[1] | [G] | Feedback magnetic field |
| $B_e$[1] | [G] | Error magnetic field for the closed loop architectures. |
| $B_{REF}$[1] | [G] | Reference magnetic field for the proposed architecture |
| $B_N$[1] | [G] | Input equivalent noise |
| $I_{EC}$ | [A] | Emitting coil current |
| $K_{EC}$(d) | [G/A] | Ratio between the emitting coil current IEC and the reflected magnetic field BR |
| $S_T$ | [V/G] | MFSE sensitivity |
| A | [V/V] | Amplifier gain |
| $I_{\Sigma\Delta}$, | [A] | Input to sigma delta modulator current |
| $V_O$ | [V] | Amplifier output voltage |
| $K_{FC}$, $K_{RC}$ | [G/A] | Feedback and reference coils sensitivity |
| K | [A/A] | Transconductances ratio |
| ModCk | — | Clock used to modulate/demodulate the signal of interest |

(1) - These magnetic fields are located at the MFSE.
(2) - This magnetic field is located at the emitting coil.

It should be noted that the sensitivity of the magnetic field sensing element $S_T$ can have variations due different effects.

In other embodiments, a second MSFE, or more, is used to normalize the output and make Equation 1 independent on the sensitivity $S_T$. However, variations due to different effects in this parameter can still have a significant impact in the measure. For example, TMR elements have relatively large amounts of variation in resistance values.

Figure 4:
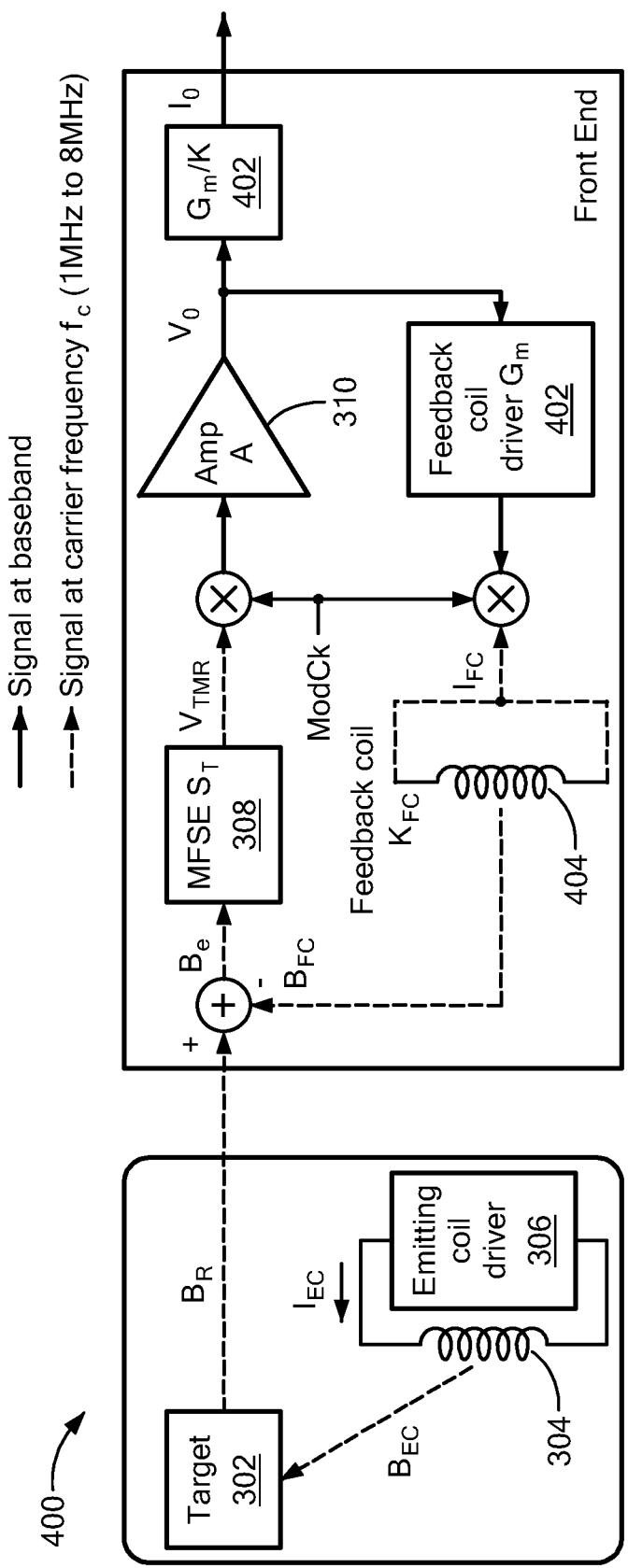
FIG. 4 is a schematic representation of a closed loop magnetic field coil activated position sensor (CAPS) in which the target and the reflected magnetic field BR are not part of the loop (BR is the input)

FIG. 4 shows an example sensor 400 that addresses such effects in the variations of MFSE 308 sensitivity and implements a closed loop architecture with the MFSE are in the forward path, where like reference numbers indicated like elements in FIG. 3. With a large enough open loop gain, the sensor sensitivity becomes independent on $S_T$. To close the loop, an auxiliary coil (feedback coil) 404 generates an equal in amplitude field $B_{FC}$ but opposite in direction field to reflected magnetic field $B_R$. Thus, the loop is closed at the magnetic field level. A feedback coil driver 402 drives the feedback coil 404 with a drive signal combined with clock signal ModCk. The feedback coil field $B_{FC}$ is summed with the reflected magnetic field $B_R$ the output Be of which is sensed by the sensing element 308. As can be seen, the feedback coil driver 402 and the feedback coil 404 are in the feedback path.

Equation 2 below shows that the system sensitivity has no dependence on $S_T$. The output current $I_O$ corresponds to target distance, and more particularly, the emitting coil current $I_{EC}$ and the ratio between the emitting coil current $I_{EC}$ and the reflected magnetic field $B_R$. It should be noted that feedback coil sensitivity $K_{FC}$ has no variation issues because it only depends on the geometry.

$$I_O = I_{EC} \cdot K_{EC}(d) \cdot \frac{1}{K_{FC} \cdot K} \overset{\mathit{If}}{=\!\!>} (S_T \cdot A \cdot G_m \cdot K_{FC} \gg 1) \quad (2)$$

It is understood that $(S_T \cdot A \cdot G_m \cdot K_{FC})$ refers to the open loop gain. The above expression is accurate if the open loop gain is much greater than 1.

Another parameter for sensor performance is the signal to noise ratio (SNR). Equation 3 shows parameters for the system shown in FIG. 4. In this equation $B_N$ is the whole system input equivalent noise. As $K_{EC}(d)$ depends on target distance, the SNR depends on it too. SNR decreases as distance increases.

$$SNR = \frac{B_{REF}}{B_N} = \frac{K_{EC}(d) \cdot I_{EC}}{B_N} \quad (3)$$

As defined above $B_N$ is the input equivalent noise.

One of the issues that conventional sensors configurations present is that the amplitude of the emitting coil current $I_{EC}$ delivered to the emitting coil is constant. When the distance d between the sensor die and the target is large, a large current amplitude is necessary. However, when the distance is short, the current amplitude can be smaller. For example, an emitter coil current may be a 1 MHz square wave at 8 mA, which may generate a relatively large reflected field $B_R$ when the target is closed to the sensor IC package.

In example embodiments of the disclosure, the dynamic adaptability of a closed loop sensor configuration is used to set an emitting coil current amplitude that corresponds to the distance between the die and the target.

Figure 5:
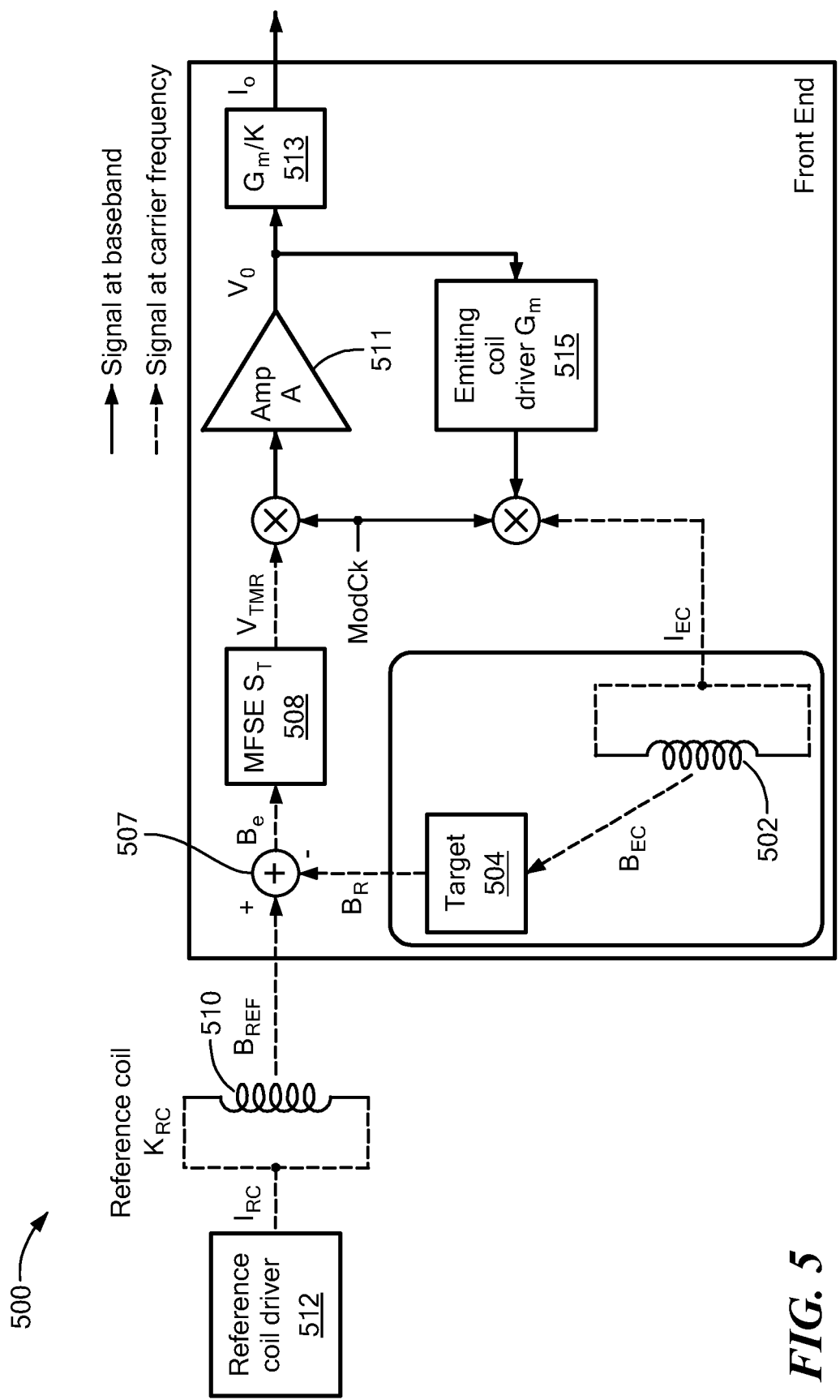
FIG. 5 is a schematic representation of a closed loop magnetic field coil activated position sensor (CAPS) having emitter coil current that corresponds to air gap distance in which the target and the reflected magnetic field are part of the feedback loop.

FIG. 5 shows an example closed loop sensor 500 having an emitting coil 502 and a target 504 that are part of the feedback loop. To be able to set the operating point of the loop, a reference magnetic field $B_{REF}$ is generated by a reference coil 510 driven by a reference coil driver circuit 512 which generates a reference coil current $I_{RC}$. This reference can be injected in the loop using a coil like the one used to implement the feedback loop in FIG. 4 but now used as the input to the system. The reference field $B_{REF}$ and the reflected field $B_R$ are summed 507 to generate an output Be that can be applied to the sensing element 508. The voltage output $V_{TMR}$ from the sensing element(s) 508 and be combined with clock signal ModCk and input to amplifier 511 to generate the output voltage $V_O$. A transconductance circuit 513 receives the output voltage $V_O$ and generates an output current $I_O$ based on transconductance $G_m$ and transconductances ratio K. The output voltage $V_O$ is feed back to the emitter coil driver 515, which has transconductance $G_m$. The emitter coil driver 515 drives the emitter coil 502 with emitter coil current $I_{EC}$ to generate a reflected field $B_R$ from the target 504.

In the illustrated embodiment, the target is external to the IC package. It is understood that in other embodiments some components, such as a coil, can be external to the IC package.

In this way, the applied magnetic field $(B_E)$ to the MFSE 508 can be considered as very small, because of the large open loop gain. Thus, the MFSE 508 works without applied magnetic field.

Equation 4 shows the relationship between the output current $I_O$ and the distance d to be measured.

$$I_o = I_{RC} \cdot K_{RC} \cdot \frac{1}{K_{EC}(d) \cdot K} \overset{\mathit{If}}{=\!\!>} (S_T \cdot A \cdot G_m \cdot K_{EC}(d) \gg 1) \quad (4)$$

To calculate the distance, an inverse function can be used, such as that shown in Equation 5.

$$d = K_{EC}^{-1}\left(\frac{I_{RC} \cdot K_{RC}}{I_O \cdot K}\right) \quad (5)$$

Equation 6 shows the relationship between the distance d and the emitting coil current. As the function $K_{EC}$ decreases when d increases, the larger the distance d, the lower the value of $K_{EC}$ and the larger $I_{EC}$.

$$I_{EC} = I_{RC} \cdot K_{RC} \cdot \frac{1}{K_{EC}(d)} \quad (6)$$

In addition, the SNR is independent of the distance d as the input magnetic field amplitude is defined by the reference coil 512. Equation 7 shows an example expression for this parameter. As noted, it does not depend on the distance.

$$SNR = \frac{B_{REF}}{B_N} = \frac{K_{RC} \cdot I_{RC}}{B_N} \quad (7)$$

While example embodiments of the disclosure are shown and described in conjunction with a CAPS sensor, it is understood that embodiments of the disclosure are applicable to any sensor functionality that can be generalized to a function $f$ that depends on a variable (x in this case) that is to be measured.

It is understood that any suitable magnetic field sensing element, such as Hall and MR elements can be used. While a voltage output from a sensing element may be designated as $V_{TMR}$ indicated a TMR sensing element for an example embodiment, a wide range of sensing element types can be used.

Figure 6:
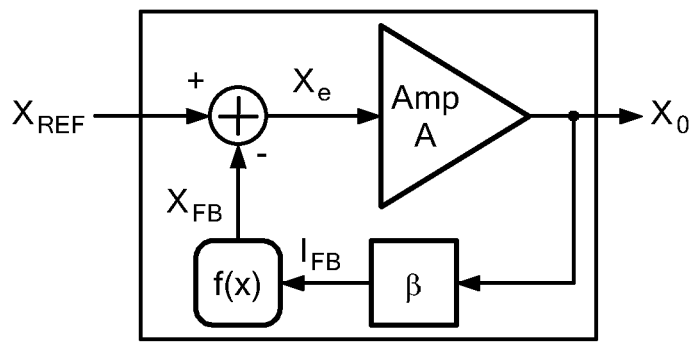
FIG. 6 is a block diagram of a closed loop sensor having feedback shown as a generalization of the sensor of FIG. 5.

FIG. 6 shows a function $f(x)$ for the ratio between the current $I_{FB}$ to be managed and a variable $X_{FB}$ used to feedback a closed loop architecture in accordance with Equation 8. It is understood that the variable $X_j$ can comprise a voltage, current, magnetic field, and the like $$\frac{X_{FB}}{I_{FB}} = f(x) \quad (8)$$

Equation 9 shows the ratio between the reference $X_{REF}$ and the output of the closed loop amplifier $X_0$.

$$\frac{X_0}{X_{REF}} \stackrel{A \cdot f(x) \cdot \beta \gg 1}{\cong} \frac{1}{f(x) \cdot \beta} \tag{9}$$

Equation 10 shows that the value of $I_{FB}$ can be defined by the reference $X_{REF}$ and the function $f(x)$ that depends on the variable to measured x. Then, given a value of $X_{REF}$, the larger $f(x)$ the shorter the feedback current $I_{FB}$ and vice versa.

$$I_{FB} = \frac{X_{REF}}{f(x)} \tag{10}$$

The Equation 11 shows how the variable to be calculated x can be obtained.

$$x = f^{-1}\left(\frac{X_{FEF}}{X_0 \cdot \beta}\right) \tag{11}$$

The SNR is presented below in the Equation 12.

$$SNR = \frac{X_{REF}}{X_N} = \frac{f(x) \cdot I_{FC}}{X_N} \tag{12}$$

Figure 7:
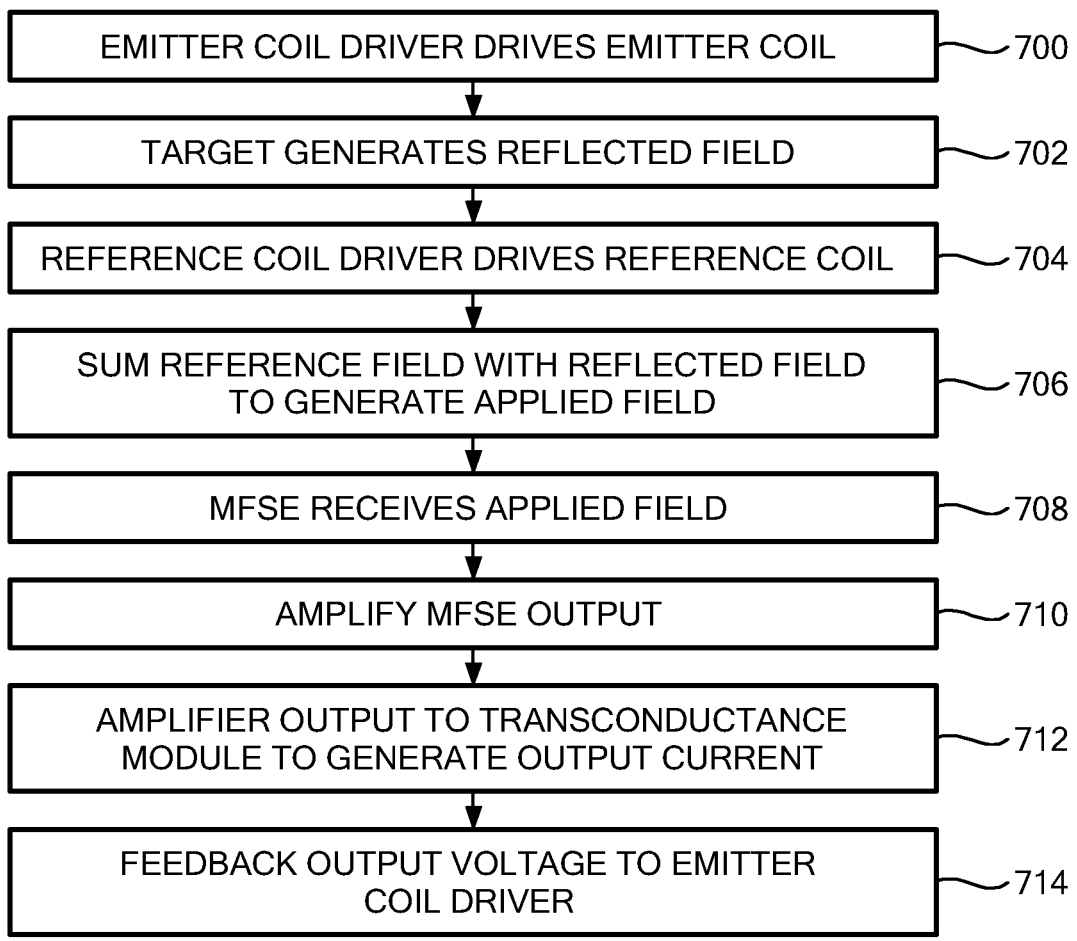
FIG. 7 is a flow diagram showing an example sequence of steps for controlling emitter coil current based on distance in a closed loop magnetic field coil activated position sensor (CAPS)

FIG. 7 shows an example sequence of steps for closed loop CAPS having emitter coil current that corresponds to a distance (d) between a die/sensing element and a conductive target. In step 700, an emitting coil driver generates an emitter current signal to an emitter coil. In step 702, a target generates a reflected field $B_R$ in response to the field from the emitter coil. In step 704, a reference coil driver generates a reference current signal to a reference coil which generate a reference field $B_{REF}$, which in step 706, can be summed with the reflected field to generate field Be applied to a magnetic field sensing element in step 708. In step 710, The output of the MFSE is amplified to generate an output voltage for a transconductance module that generates an output current in step 712. In step 714, the output voltage is fed back to the emitter coil driver to form a closed loop feedback path with the emitter coil.

Example embodiments of the disclosure provide closed loop sensors that allow measurement of the distance (d) between a die and a conductive target instead. A magnetic field generates eddy currents in the target that reflects a magnetic field back to the die. A reflected magnetic field ($B_R$) is detected by magnetic field sensing elements with a certain sensitivity $S_T$, and then amplified. An emitting coil and the target are in the feedback loop to control a current to the emitting coil based on a distance to the target. With this arrangement, lower current levels can be used for closer targets.

Example CAPS implementations are shown and described in U.S. Pat. Nos. 10,996,289; 10,917,092; 11,624,791, each of which is incorporated herein by reference.

Figure 8:
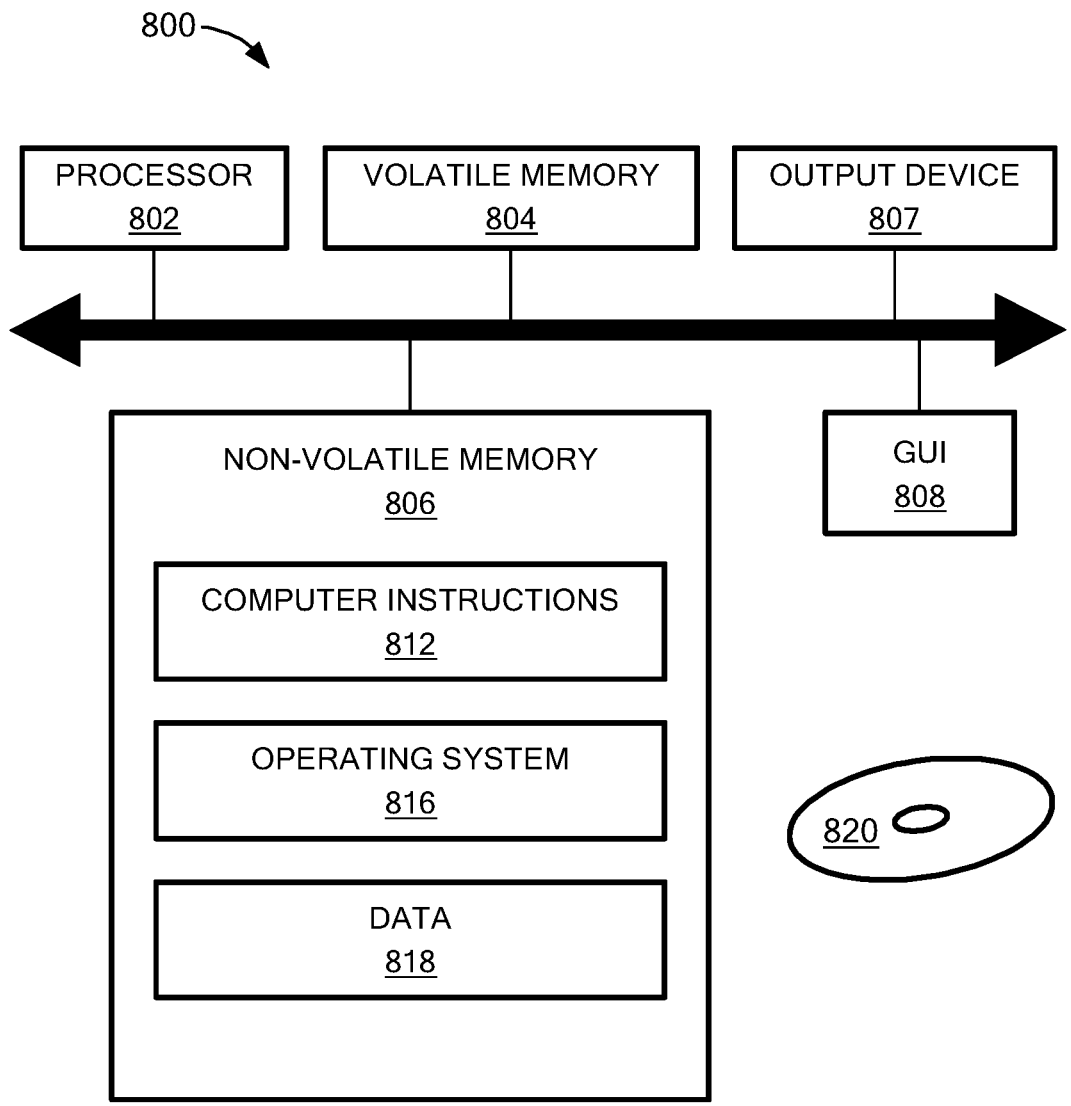
FIG. 8 is a schematic representation of an example computer that can perform at least a portion of the processing described herein.

FIG. 8 shows an exemplary computer 800 that can perform at least part of the processing described herein. For example, the computer 800 can perform processing to control the emitter current. The computer 800 includes a processor 802, a volatile memory 804, a non-volatile memory 806 (e.g., hard disk), an output device 807 and a graphical user interface (GUI) 808 (e.g., a mouse, a keyboard, a display, for example). The non-volatile memory 806 stores computer instructions 812, an operating system 816 and data 818. In one example, the computer instructions 812 are executed by the processor 802 out of volatile memory 804. In one embodiment, an article 820 comprises non-transitory computer-readable instructions.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high-level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., RAM/ROM, CD-ROM, hard disk, or magnetic diskette) that is readable by a general or special purpose programmable computer for configuring and operating the computer when the storage medium or device is read by the computer.

Processing may also be implemented as a machine-readable storage medium, configured with a computer program, where upon execution, instructions in the computer program cause the computer to operate.

Processing may be performed by one or more programmable processors executing one or more computer programs to perform the functions of the system. All or part of the system may be implemented as special purpose logic circuitry (e.g., an FPGA (field programmable gate array), a general purpose graphical processing units (GPGPU), and/or an ASIC (application-specific integrated circuit)).

Various embodiments of the concepts, systems, devices, structures, and techniques sought to be protected are described above with reference to the related drawings. Alternative embodiments can be devised without departing from the scope of the concepts, systems, devices, structures, and techniques described. For example, while reference is made above to use of magnetoresistance elements, other types of magnetic field sensing elements may be used within the scope of the present disclosure. Furthermore, implementations of the described techniques may include hardware, a method or process, or computer software on a computer-accessible medium. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

It is noted that various connections and positional relationships (e.g., over, below, adjacent, etc.) may be used to describe elements in the description and drawing. These connections and/or positional relationships, unless specified otherwise, can be direct or indirect, and the described concepts, systems, devices, structures, and techniques are not intended to be limiting in this respect. Accordingly, a coupling of entities can refer to either a direct or an indirect coupling, and a positional relationship between entities can be a direct or indirect positional relationship.

Also, the following definitions and abbreviations are to be used for the interpretation of the claims and the specification. The terms "comprise," "comprises," "comprising," "include," "includes," "including," "has," "having," "contains" or "containing," or any other variation are intended to cover a non-exclusive inclusion. For example, an apparatus, a method, a composition, a mixture, or an article, that includes a list of elements is not necessarily limited to only those elements but can include other elements not expressly listed or inherent to such apparatus, method, composition, mixture, or article.

Additionally, the term "exemplary" means "serving as an example, instance, or illustration. Any embodiment or design described as "exemplary" is not necessarily to be construed as preferred or advantageous over other embodiments or designs. The terms "one or more" and "at least one" indicate any integer number greater than or equal to one, i.e., one, two, three, four, etc. The term "plurality" indicates any integer number greater than one. The term "connection" can include an indirect "connection" and a direct "connection".

References in the specification to "embodiments," "one embodiment," "an embodiment," "an example embodiment," "an example," "an instance," "an aspect," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it may affect such feature, structure, or characteristic in other embodiments whether explicitly described or not.

Use of ordinal terms such as "first," "second," "third," etc., in the claims to modify a claim element does not by itself connote any priority, precedence, or order of one claim element over another, or a temporal order in which acts of a method are performed, but are used merely as labels to distinguish one claim element having a certain name from another element having a same name (but for use of the ordinal term) to distinguish the claim elements.

The disclosed subject matter is not limited in its application to the details of construction and to the arrangements of the components set forth in the following description or illustrated in the drawings. The disclosed subject matter is capable of other embodiments and of being practiced and carried out in various ways.

Also, the phraseology and terminology used in this patent are for the purpose of description and should not be regarded as limiting. As such, the conception upon which this disclosure is based may readily be utilized as a basis for the designing of other structures, methods, and systems for carrying out the several purposes of the disclosed subject matter. Therefore, the claims should be regarded as including such equivalent constructions as far as they do not depart from the spirit and scope of the disclosed subject matter.

Although the disclosed subject matter has been described and illustrated in the foregoing exemplary embodiments, the present disclosure has been made only by way of example. Thus, numerous changes in the details of implementation of the disclosed subject matter may be made without departing from the spirit and scope of the disclosed subject matter.

Accordingly, the scope of this patent should not be limited to the described implementations but rather should be limited only by the spirit and scope of the following claims. All publications and references cited in this patent are expressly incorporated by reference in their entirety.

What is claimed is:

1. A magnetic field sensor, comprising:
   an emitter coil drive circuit for outputting an emitter current to an emitter coil for generating an emitter field;
   a reference coil drive circuit for outputting a reference current to a reference coil for generating a reference field;
   a combiner to combine a reflected field generated by a target in response to the emitter field and the reference field and output an applied field;
   a magnetic field sensing element to receive the applied field and generate an electric signal;
   an amplifier to amplify the electric signal, wherein an output of the amplifier is coupled to the emitter coil drive circuit;
   a transconductance module to generate an output current from the electric signal;
   wherein the sensor comprises a closed loop configuration with a feedback path that includes the emitter coil drive circuit and the emitter coil and is configured to modify an amplitude of the emitter current signal based on a distance from the target to the magnetic field sensing element.

2. The sensor according to claim 1, wherein the applied field comprises a signal at carrier frequency.

3. The sensor according to claim 1, wherein the output signal from the magnetic field sensing element is demodulated to a baseband frequency and input to the amplifier.

4. The sensor according to claim 1, wherein the distance d is determined as $$d = K_{EC}^{-1}\left(\frac{I_{RC} \cdot K_{RC}}{I_O \cdot K}\right)$$

where Io is the output current from the transconductance module,
$I_{RC}$ is the reference current

| | | |
|---|---|---|
| $K_{EC}(d)$ | [G/A] | Ratio between the emitting coil current IEC and the reflected magnetic field BR |
| $K_{FC}$, $K_{RC}$ | [G/A] | Feedback and reference coils sensitivity |
| K | [A/A] | Transconductances ratio. |

5. The sensor according to claim 1, wherein the emitter current is determined as:

$$I_{EC} = I_{RC} \cdot K_{RC} \cdot \frac{1}{K_{EC}(d)}$$

where $I_{RC}$ is the reference current, and

| $K_{EC}(d)$ | [G/A] | Ratio between the emitting coil current $I_{EC}$ and the reflected magnetic field BR |
|---|---|---|
| $K_{FC}$, $K_{RC}$ | [G/A] | Feedback and reference coils sensitivity. |

6. The sensor according to claim 1, wherein the magnetic field sensing element comprises a magnetoresistance (MR) element.

7. The sensor according to claim 1, wherein the magnetic field sensing element comprises a Hall element.

8. A method, comprising:
outputting an emitter current to an emitter coil for generating an emitter field;
outputting a reference current to a reference coil for generating a reference field;
combining a reflected field generated by a target in response to the emitter field and the reference field and output an applied field;
receiving the applied field and generating an electric signal by a magnetic field sensing element in a magnetic field sensor;
amplifying the electric signal with an amplifier, wherein an output of the amplifier is coupled to an emitter coil drive circuit for generating the emitter current; and
generating an output current from the electric signal;
wherein the sensor comprises a closed loop configuration with a feedback path that includes the emitter coil drive circuit and the emitter coil and is configured to modify an amplitude of the emitter current signal based on a distance from the target to the magnetic field sensing element.

9. The method according to claim 8, wherein the applied field comprises a signal at carrier frequency.

10. The method according to claim 8, wherein the output signal from the magnetic field sensing element is demodulated to a baseband frequency and input to the amplifier.

11. The method according to claim 1, wherein the distance d is determined as $$d = K_{EC}^{-1}\left(\frac{I_{RC} \cdot K_{RC}}{I_O \cdot K}\right)$$

where Io is the output current from the transconductance module,
$I_{RC}$ is the reference current,

| $K_{EC}(d)$ | [G/A] | Ratio between the emitting coil current IEC and the reflected magnetic field BR |
|---|---|---|
| $K_{FC}$, $K_{RC}$ | [G/A] | Feedback and reference coils sensitivity |
| K | [A/A] | Transconductances ratio. |

12. The method according to claim 1, wherein the emitter current is determined as:

$$I_{EC} = I_{RC} \cdot K_{RC} \cdot \frac{1}{K_{EC}(d)}$$

where $I_{RC}$ is the reference current, and

| $K_{EC}(d)$ | [G/A] | Ratio between the emitting coil current $I_{EC}$ and the reflected magnetic field BR |
|---|---|---|
| $K_{FC}$, $K_{RC}$ | [G/A] | Feedback and reference coils sensitivity. |

13. The method according to claim 8, wherein the magnetic field sensing element comprises a magnetoresistance (MR) element.

14. The method according to claim 1, wherein the magnetic field sensing element comprises a Hall element.

15. A magnetic field sensor, comprising:
an emitter coil drive circuit for outputting an emitter current to an emitter coil for generating an emitter field;
a reference coil drive circuit for outputting a reference current to a reference coil for generating a reference field;
a combiner to combine a reflected field generated by a target in response to the emitter field and the reference field and output an applied field;
a magnetic field sensing element to receive the applied field and generate an electric signal;
an amplifier to amplify the electric signal, wherein an output of the amplifier is coupled to the emitter coil drive circuit;
a transconductance module to generate an output current from the electric signal; and
a means for providing a closed loop feedback.

* * * * *